(12) United States Patent
Yamaguchi et al.

(10) Patent No.: US 9,446,552 B2
(45) Date of Patent: Sep. 20, 2016

(54) BLOW MOLDING MACHINE

(71) Applicant: NISSEI ASB MACHINE CO., LTD., Nagano (JP)

(72) Inventors: Masaki Yamaguchi, Nagano (JP); Masatoshi Ando, Nagano (JP); Takashi Kobayashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 14/422,599

(22) PCT Filed: Aug. 20, 2013

(86) PCT No.: PCT/JP2013/072174
§ 371 (c)(1),
(2) Date: Feb. 19, 2015

(87) PCT Pub. No.: WO2014/030639
PCT Pub. Date: Feb. 27, 2014

(65) Prior Publication Data
US 2015/0231816 A1 Aug. 20, 2015

(30) Foreign Application Priority Data
Aug. 20, 2012 (JP) ................................ 2012-181878

(51) Int. Cl.
*B29C 49/42* (2006.01)
*B29C 49/06* (2006.01)
(Continued)

(52) U.S. Cl.
CPC ............ *B29C 49/70* (2013.01); *B29C 49/28* (2013.01); *B29C 49/421* (2013.01); *B29C 49/4205* (2013.01); *B29C 49/4236* (2013.01); *B65G 19/025* (2013.01)

(58) Field of Classification Search
CPC ............. B65G 19/025; B29C 49/421; B29C 49/4205; B29C 49/064; B29C 49/4252; B29C 2949/7826; B29C 2949/78268; B29C 2949/78453; B29C 2949/78478; B29C 2949/78773; B29C 2949/78781; B29C 2949/78966; B29C 2949/78991
USPC .......................................... 279/3; 198/803.5
See application file for complete search history.

(56) References Cited

U.S. PATENT DOCUMENTS 4,802,571 A * 2/1989 Born ...................... B65G 15/14
198/626.1
8,112,969 B2 * 2/2012 Backhaus .......... B65G 47/5113
198/347.1

(Continued)

FOREIGN PATENT DOCUMENTS

CH  EP 1215031 A1 * 6/2002 ............. B29B 11/08
EP      0248376 A2    12/1987
(Continued)

OTHER PUBLICATIONS

Partial machine translation of JP 2007-044992A dated Feb. 2007, obtained from the espace website.*

(Continued)

*Primary Examiner* — Robert B Davis
(74) *Attorney, Agent, or Firm* — David L. Hoffman; Hoffman Patent Group

(57) ABSTRACT

A blow molding machine 1 has a blow molding section 10, an ejection section 20, and a delivery unit 100. In order to deliver a plurality of containers B to a device 200 of a post-process subsequent to the blow molding machine, the delivery unit includes a rail for holding, delivering and guiding the plurality of containers, and an elevation block raised and lowered relative to the rail. The elevation block includes a plurality of blades, an endless member to which the plurality of blades are fixed at a blow molding pitch, and a drive portion for driving the endless member to run.

15 Claims, 21 Drawing Sheets

(51) Int. Cl.
*B29C 49/70* (2006.01)
*B29C 49/28* (2006.01)
*B65G 19/02* (2006.01)

(56) References Cited

U.S. PATENT DOCUMENTS

| | | | |
|---|---|---|---|
| 8,777,606 B2* | 7/2014 | Yamaguchi | B29C 49/06 425/526 |
| 2002/0011681 A1* | 1/2002 | Rose | B29C 49/18 264/40.1 |
| 2011/0109018 A1* | 5/2011 | Parrinello | B65B 47/08 264/524 |
| 2013/0056913 A1* | 3/2013 | Forsthoevel | B29C 49/06 264/535 |

FOREIGN PATENT DOCUMENTS

| | | |
|---|---|---|
| EP | 0872329 A1 | 10/1998 |
| JP | 64008116 | 1/1989 |
| JP | 08132517 | 5/1996 |
| JP | 08147551 | 6/1996 |
| JP | 08224775 | 9/1996 |
| JP | 10076567 | 3/1998 |
| JP | 2002509064 A | 3/2002 |
| JP | 2007044992 | 2/2007 |
| JP | 2009121946 | 6/2009 |
| WO | 9936337 A1 | 7/1999 |
| WO | 2012046620 A1 | 4/2012 |
| WO | 2012057016 A1 | 5/2012 |
| WO | 2013058378 A1 | 4/2013 |

OTHER PUBLICATIONS

Partial Supplementary European Search Report, Application No. 13830904.2-1706 / 2886297 (PCTJP2013072174), dated Apr. 18, 2016.

* cited by examiner (A)

(B)

A-A

A-A

BLOW MOLDING MACHINE

This application is a U.S. national stage application of International Patent Application No. PCT/JP2013/072174, having an international filing date of Aug. 20, 2013, which designated the United States and which claims priority from Japanese Patent Application No. 2012-181878, filed on Aug. 20, 2012, the entirety of both of which are incorporated herein by reference.

TECHNICAL FIELD

This invention relates to a blow molding machine and, in particular, a blow molding machine for delivering a blow molded container to a device for a process subsequent to the blow molding machine (may be referred to as a post-process).

BACKGROUND ART

Among blow molding machines is a blow molding machine operated by a so-called 1.5 stage process which has the advantages of both a 1 stage process and a 2 stage process (see, for example, Patent Document 1). The blow molding machine according to the 1.5 stage process, like a blow molding machine according to the 1 stage process, is equipped with an injection molding unit or section for forming a preform by injection molding, a blow molding unit or section for forming a container (bottle) by blow molding the preform, and a transport unit or section for transporting a plurality of the preforms to the blow molding unit or section. However, a blow molding cycle is shorter than an injection molding cycle carried out in the injection molding unit or section, and the ratio between the number N of simultaneously injection molded products and the number M of simultaneously blow molded products is set, for example, at N:M=3:1.

The bottle formed by blow molding in such a blow molding machine is either dropped onto a chute, or carried to the outside of the machine while being maintained in an upright or inverted posture. In Patent Document 2, a blow molding section is provided on one side of a rectangular transport path for transporting the preform or bottle in an inverted state, and a product ejection section is provided on another side of the transport path adjacent to the one side. The product ejection section reverses the container from an inverted state to an upright state, and ejects the container out of the blow molding machine, by means of an arm which grips a neck portion of the container being transported in the inverted state after blow molding. The inverted state refers to a state in which the neck portion faces downward, while the upright state means the reverse of the inverted state. In Patent Document 3, a blow molded container is transported by a plug provided on a conveyor belt, and is delivered from a discharge station to a rail. Then, the container is delivered to a post-process along the rail by an air jet ejected from a slit formed in a hollow conduit provided along the rail.

PRIOR ART DOCUMENTS

Patent Documents

Patent Document 1: Japanese Patent No. 2954858
Patent Document 2: JP-A-8-224775 Patent Document 3: JP-T-2002-509064

SUMMARY OF THE INVENTION

Problems to be Solved by the Invention

In accordance with the high cycle operation of the blow molding machine, the post-process is also automated and integrated into one line, thus enabling integrated manufacture ranging from bottle production to filling and labeling. In order not to stop the production line involving high speed processing, it is necessary to deliver bottles, which have been transported from the blow molding machine, to the line for the post-process speedily, stably and reliably.

The blow molding machines disclosed in Patent Document 2 and Patent Document 3 can supply the blow-molded containers continuously to the post-process. Patent Document 2, however, does not disclose a device for delivering the container, which has been conveyed to the outside of the machine by the arm of the product ejection section, to the device of the post-process.

If the bottle supported by the rail is carried out to the post-process by an air jet, as in Patent Document 3, it is difficult to carry the bottles outward, with the bottles being maintained at constant intervals. Thus, the bottles being carried out may collide with each other to damage the bottles and deform them. It is also difficult to make a precision adjustment of the air jet in charge of the bottle carry-out action, and an adjusting operation is tiresome.

The present invention has been accomplished in the light of the foregoing circumstances. It is an object of the invention to provide a blow molding machine which stabilizes the act of delivering a blow-molded container to a post-process, and which facilitates the adjustment of the delivery action so as to be adapted for the device of the post-process.

In the blow molding machine according to the 1.5 stage process, batch processing is performed in the injection molding section and the blow molding section, whereas preforms are continuously transported in the transport section. With such a blow molding machine, when the time involved in injection molding or blow molding is to be changed during a molding operation, the machine needs to be stopped once, thus posing the problem of a poor operating efficiency.

The present invention has been accomplished in the light of the above circumstances. It is an object of the invention to provide a blow molding machine which can change the time involved in injection molding or blow molding, without stopping the molding operation.

The blow molding machine is also equipped with a cooling section for forcibly cooling a preform injection molded in the injection molding section. Transport of the preform from the injection molding section to the cooling section is performed, for example, by a vacuum means. That is, the interior of the preform is sucked by the vacuum means mounted on a neck portion of the preform, whereby the preform is held and transported. During this process, the interior of the preform is always at a negative pressure, so that a barrel portion of the preform may be deformed in a concave shape. This deformation of the preform affects the shape (quality) of the blow-molded container.

The present invention has been accomplished in the light of the above circumstances. It is an object of the invention to provide a blow molding machine which can transport the preform from the injection molding section to the cooling section without deforming it.

Means for Solving the Problems

A first aspect of the present invention, aimed at solving the above problems, is a blow molding machine comprising a blow molding section for blow molding a plurality of containers within a blow cavity mold which has been mold clamped, and an ejection section for holding the plurality of containers, while maintaining a blow molding pitch, and ejecting the plurality of containers from the blow cavity mold, which has been mold opened, to an ejection position outside the blow cavity mold, the blow molding machine further comprising a delivery unit for delivering the plurality of containers located at the ejection position to a post-process subsequent to the blow molding machine, wherein the delivery unit includes a rail for holding, delivering and guiding the plurality of containers, and an elevation block raised and lowered relative to the rail, and the elevation block includes a plurality of blades, an endless member having the plurality of blades fixed thereto at the blow molding pitch, and a drive portion for driving the endless member to run.

According to the above-mentioned first aspect of the present invention, the plurality of containers eject to the ejection position outside the blow cavity mold by the ejection section of the blow molding machine are held on the rail. In the elevation block raised or lowered with respect to the rail, the plurality of blades are inserted between the plurality of containers, and the endless member having the plurality of blades fixed thereto at the blow molding pitch is driven and run by the drive portion. Thus, the plurality of containers are pushed by the plurality of blades, and delivered to the device outside the blow molding machine, with the blow molding pitch being maintained along the rail. After the delivery action, the elevation section returns to the original position. When a plurality of containers blow molded next time are ejected to the ejection position, therefore, the plurality of containers do not interfere with the plurality of blades.

Moreover, the plurality of containers are pushed by the plurality of blades, whereby they are maintained at the blow molding pitch and delivered. Thus, the risk that the containers being delivered will collide with each other, resulting in damage to the container, is reduced. Furthermore, the speed of the plurality of blades in charge of the delivery action for the containers can be easily adjusted by adjusting the drive speed or the like of the drive portion. Thus, the act of delivering the blow-molded container to the post-process becomes stable, and the delivery action can be easily adjusted in conformity to the device of the post-process.

A second aspect of the present invention is the blow molding machine according to the first aspect of the invention, further comprising a machine base on which the blow molding section is mounted, wherein the delivery unit protrudes from the machine base along a container delivery direction orthogonal to the opening/closing direction of the blow cavity mold.

According to this feature, the ejection section allows the plurality of containers to move rectilinearly along the container delivery direction from the mold-opened blow cavity mold and ejects them to the ejection position, and the delivery unit may further carry the plurality of container outward along the container delivery direction. By protruding the delivery unit from the machine base toward the container delivery direction, at least a part of the delivery unit can be arranged to overlap the device of the post-process in a plan view. By so doing, it is not necessarily required to add a container transport device for coupling the blow molding machine and the device of the post-process, or to protrude the structure of a portion of the device of the post-process, which is supplied with the container, toward the blow molding machine.

A third aspect of the present invention is the blow molding machine according to the second aspect of the invention, wherein the rail includes a pair of rail members which, with the plurality of containers being in an upright state where a neck portion of each container faces upward, supports from below a flange portion provided in the neck portion, the pair of rail members being arranged along the container delivery direction, and each of the plurality of blades pushes the neck portion.

According to this feature, the plurality of blades can push the neck portions having the flange portions supported by the pair of rail members. In this manner, the plurality of containers are delivered smoothly along the rail, with the upright state thereof being maintained.

A fourth aspect of the present invention is the blow molding machine according to the third aspect of the invention, wherein each of the plurality of blades includes a protruding piece to be inserted between the paired rail members, and the protruding piece pushes the flange portion.

According to this feature, the flange portion running on the rail is itself pushed. Thus, the delivery action on the container is further stabilized, and the tilt or the like of the container is further reduced.

A fifth aspect of the present invention is the blow molding machine according to the third or fourth aspect of the invention, further comprising a rail drive portion for driving at least one of the paired rail members to drop the plurality of containers at the ejection position.

According to the above feature, the rail drive portion is drivably controlled by a container discharge mode signal or the like to perform opening driving for widening the spacing between the paired rail members, whereby containers during preliminary operation or containers conformed to a molding failure signal can be dropped. By this measure, supply of containers to the post-process subsequent to the blow molding machine can be stopped.

A sixth aspect of the present invention is the blow molding machine according to any one of the third to fifth aspects of the invention, wherein the pair of rail members is supported to be retreatable to a position which does not interfere with a carry-in/carry-out path of the blow cavity mold parallel to the container delivery direction.

The direction of container delivery by the delivery unit, and the carry-in/carry-out path where the blow cavity mold is carried into or out of the blow molding machine, substantially coincide with each other, with the result that the rail presents an obstacle during carry-in and carry-out of the blow cavity mold. Thus, the pair of rail members is rendered retreatable, thereby lessening burden on the carry-in and carry-out operation for the blow cavity mold.

A seventh aspect of the present invention is the blow molding machine according to any one of the first to sixth aspects of the invention, wherein the blow cavity mold can be switched between a first blow cavity mold whose blow molding pitch is a first blow molding pitch and a second blow cavity mold whose blow molding pitch is a second blow molding pitch, the second blow molding pitch being n times (n is an integer of 2 or more) the first blow molding pitch, and the plurality of blades are fixed to the endless member at the first blow molding pitch.

As mentioned above, as long as the second blow molding pitch is n times the first blow molding pitch, the plurality of blades fixed to the endless member at the first blow molding pitch can be shared between the first and second blow cavity molds.

An eighth aspect of the present invention is a blow molding machine comprising an injection molding section for injection molding a plurality of preforms, and a blow molding section for stretch blow molding a predetermined number of the preforms, at a time, into containers, the blow molding machine further comprising a transport section including an intermittent transport section for intermittently transporting the predetermined number of preforms along a transport path, a transfer section for gripping the predetermined number of preforms being transported on the transport path by the intermittent transport section, and transferring the predetermined number of preforms to the blow molding section, a discharge section, provided downstream of the transfer section on the transport path, for discharging the preforms from the transport path, and change means for making a change in at least one of an injection molding cycle time and a blow molding cycle time, and making a change in the transport speed of the preform by the transport section in accordance with the change, wherein if some of the plurality of preforms go beyond the transfer section at a timing, at which the transfer section transfers the preform to the blow molding section, in association with the changes by the change means, the transport section transports the predetermined number of preforms to the discharge section.

By so doing, even if the injection molding cycle time or the blow molding cycle time is changed during normal operation, constant molding can be performed without stopping the machine, so that an increased production efficiency is obtained.

A ninth aspect of the present invention is the blow molding machine according to the eighth aspect of the invention, further comprising a heating section equipped with a heater for heating the preforms being continuously transported on the transport path, wherein the change means further changes the output of the heater.

According to the above feature, the preform can be heated to a more suitable temperature by the heating section, and the quality of the container formed by blow molding is improved.

A tenth aspect of the present invention is a blow molding machine comprising an injection molding section for injection molding a preform, and a blow molding section for stretch blow molding the preform into a container, the blow molding machine further comprising a cooling section for forcibly cooling the preform injection molded by the injection molding section, and a preform transport section for holding the preform injection molded by the injection molding section, and transporting the preform to the cooling section, wherein the preform transport section has an insertion portion to be inserted into a neck portion of the preform, a suction holding portion for sucking the interior of the preform, with the insertion portion being inserted into the neck portion of the preform, to hold the preform, and a grip mechanism portion equipped with an openable and closable chuck portion and gripping from outside the neck portion of the preform having the insertion portion inserted into the neck portion.

According to the above feature, when the preform is transported to the cooling section, occurrence of concave deformation in the barrel portion of the preform can be suppressed. Thus, the quality of the container formed by blow molding is improved.

An eleventh aspect of the present invention is the blow molding machine according to the tenth aspect of the invention, wherein the preform transport section stops suction of the interior of the preform by the suction holding portion when the preform is gripped by the grip mechanism portion.

According to the above feature, when the preform is transported to the cooling section, occurrence of concave deformation in the barrel portion of the preform can be suppressed more reliably.

MODE FOR CARRYING OUT THE INVENTION

An embodiment of the present invention will now be described in detail using the accompanying drawings. The embodiment explained below does not unduly limit the contents of the invention described in the scope of the claims. Moreover, not all of the features described below are the indispensable constituent features of the invention.

1. Blow Molding Section and Ejection Section

A blow molding machine 1 has a blow molding section 10, a delivery unit 100, and an ejection section 20 for ejecting a bottle (container) from the blow molding section 10 toward the delivery unit 100.

Figure 2:
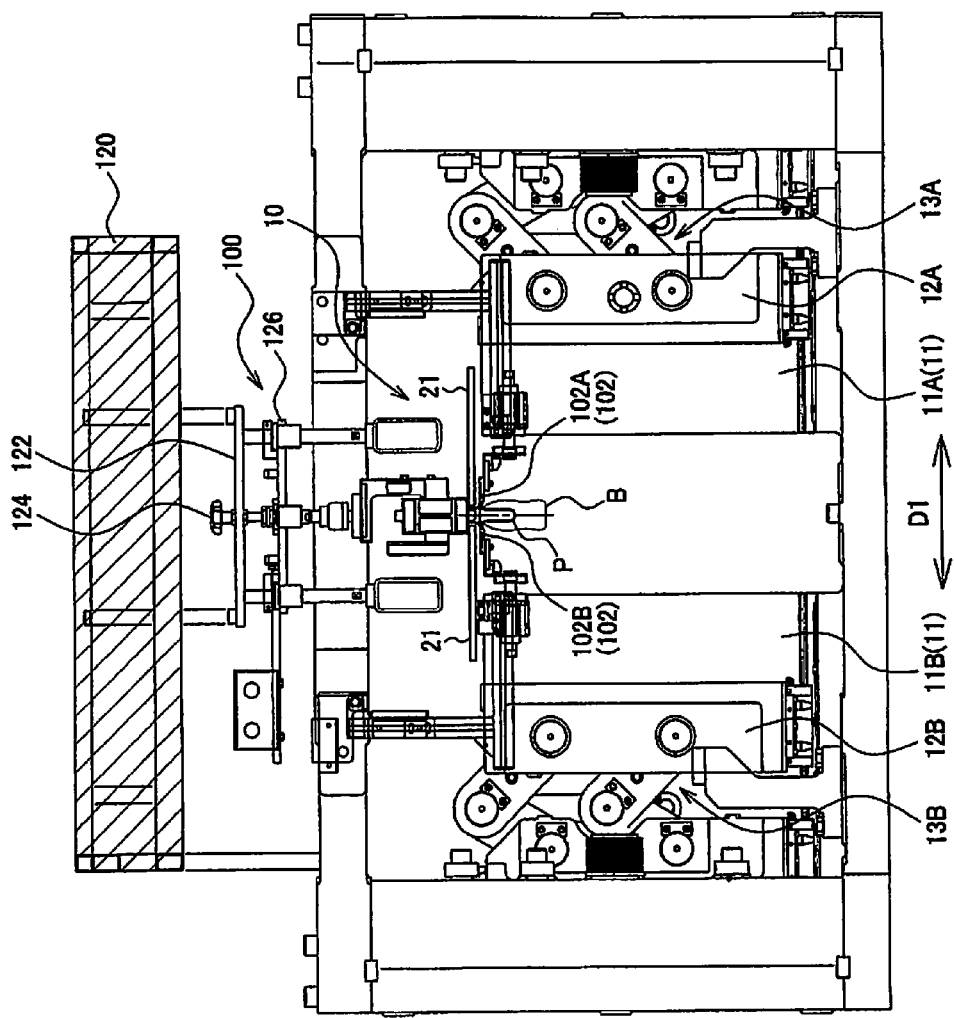
FIG. 2 is a side view of the blow molding machine shown in FIG. 1.

The blow molding section 10 provided on a machine base 2 of the blow molding machine 1 blow molds a preform P into a bottle B within a blow cavity mold 11 having a pair of blow cavity split molds 11A, 11B, as shown in FIG. 2. The blow cavity split molds 11A, 11B are fixed to mold clamping plates 12A, 12B. The mold clamping plates 12A, 12B are coupled, for example, to toggle mechanisms 13A, 13B. The toggle mechanisms 13A, 13B are driven by mold clamping mechanisms (not shown), whereby the blow cavity split molds 11A, 11B are mold-opened, mold-closed, and mold-clamped in directions of arrows D1 in FIG. 2.

Figure 1:
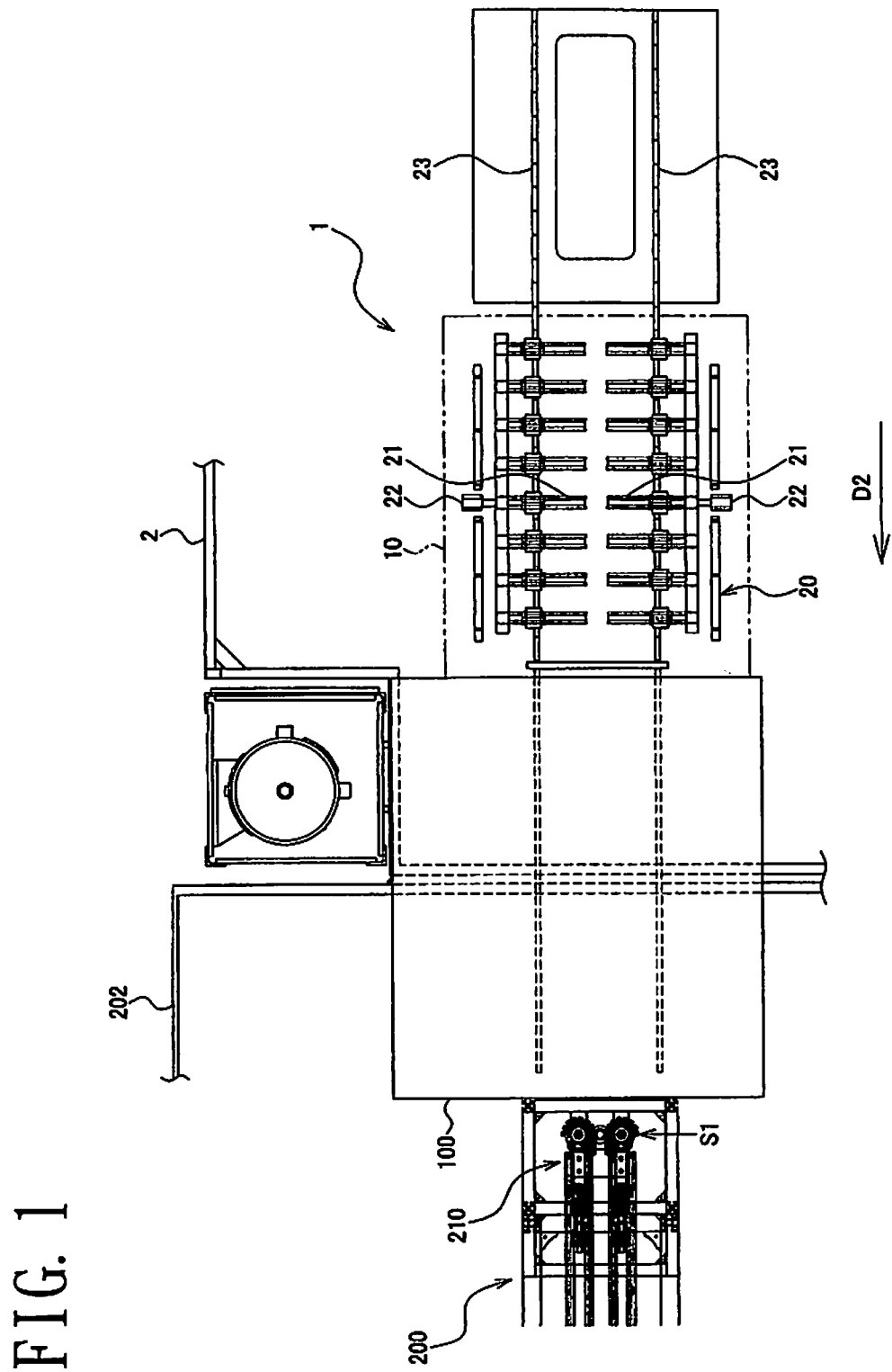
FIG. 1 is a plan view showing a blow molding machine and a device of a post-process subsequent thereto.

The ejection section 20 holds the bottles B while maintaining a blow molding pitch, and ejects the bottle B from the mold-opened blow cavity mold 11 to an ejection position within the delivery unit 100 outside the blow cavity mold 11. For this purpose, the ejection section 20 has a pair of arms 21 for gripping a neck portion of the bottle B, air cylinders 22 for moving the pair of arms 21 to open and close, guide rails 23 for rectilinearly moving and guiding the pair of arms 21 and the air cylinders 22, and a rectilinear drive portion (not shown) for driving the pair of arms 21 and the air cylinders 22 along the guide rails 23. As the paired arms 21, the largest number of them that can be simultaneously molded in the blow molding section 10, for example, 8 pairs of the arms 21, are provided. The pair of arms 21 grips the neck portion of the blow-molded bottle B by the closing drive of the air cylinders 22 after blow molding, but before the mold opening of the blow cavity mold 11. Then, the pair of arms 21 is moved in the direction of an arrow D2 in FIG. 1 along the guide rails 23 to transport the bottle B to the ejection position within the delivery unit 100. The direction of the arrow D2 in FIG. 1 is a direction orthogonal, in a horizontal plane, to the directions of the arrows D1 in FIG. 2. At the ejection position, the pair of arms 21 is driven to open by the air cylinders 22, and the bottle B is delivered to the delivery unit 100. Then, the pair of arms 21 is moved to return to the blow blowing section 10 along the guide rails 23.

2. Delivery Unit 2.1 Structure of Delivery Unit

FIG. 1 shows the blow molding machine 1 and, for example, a filling device 200 of a post-process subsequent thereto. At least a part of the delivery unit 100 can be provided to protrude from the machine base 2 of the blow molding machine 1 in the direction of the arrow D2 in FIG. 1. The part of the delivery unit 100 protruding beyond the machine base 2 can extend to a portion above a machine base 202 of the filling device 200. Thus, there is no need to add a container transport device for coupling the blow molding machine 1 and the filling device 200, or to protrude the structure of a portion of the filling device 200, which is supplied with the container, toward the blow molding machine 1. On the machine base 202 of the filling device 200, a transport device 210 can be provided for transporting the bottle B delivered from the delivery unit 100.

The delivery unit 100 will be explained by reference to FIG. 3 to FIG. 9 in addition to FIG. 2. FIGS. 3 to 6 show three types of bottles, B1 to B3, with different lengths and outer diameters, among many types of bottles B blow moldable by replacing the blow cavity mold 11 of the blow molding machine 1. The small bottles B1 can be blow molded at a first blow molding pitch P1. The relatively large bottles B2, B3 are molded at a second blow molding pitch P2. P2=n×P1 where n is an integer of 2 or more. In the present embodiment, the number of the small bottles B1 to be simultaneously blow molded is set at 8, while the number of the large bottles B2, B3 to be simultaneously blow molded is set at 4, with P2=2×P1. The delivery unit 100 may be supplied with the preform P, for example, when the blow molding machine 1 is in a preliminary operation. Handling of the preform P in the delivery unit 100 will be described later.

Figure 3:
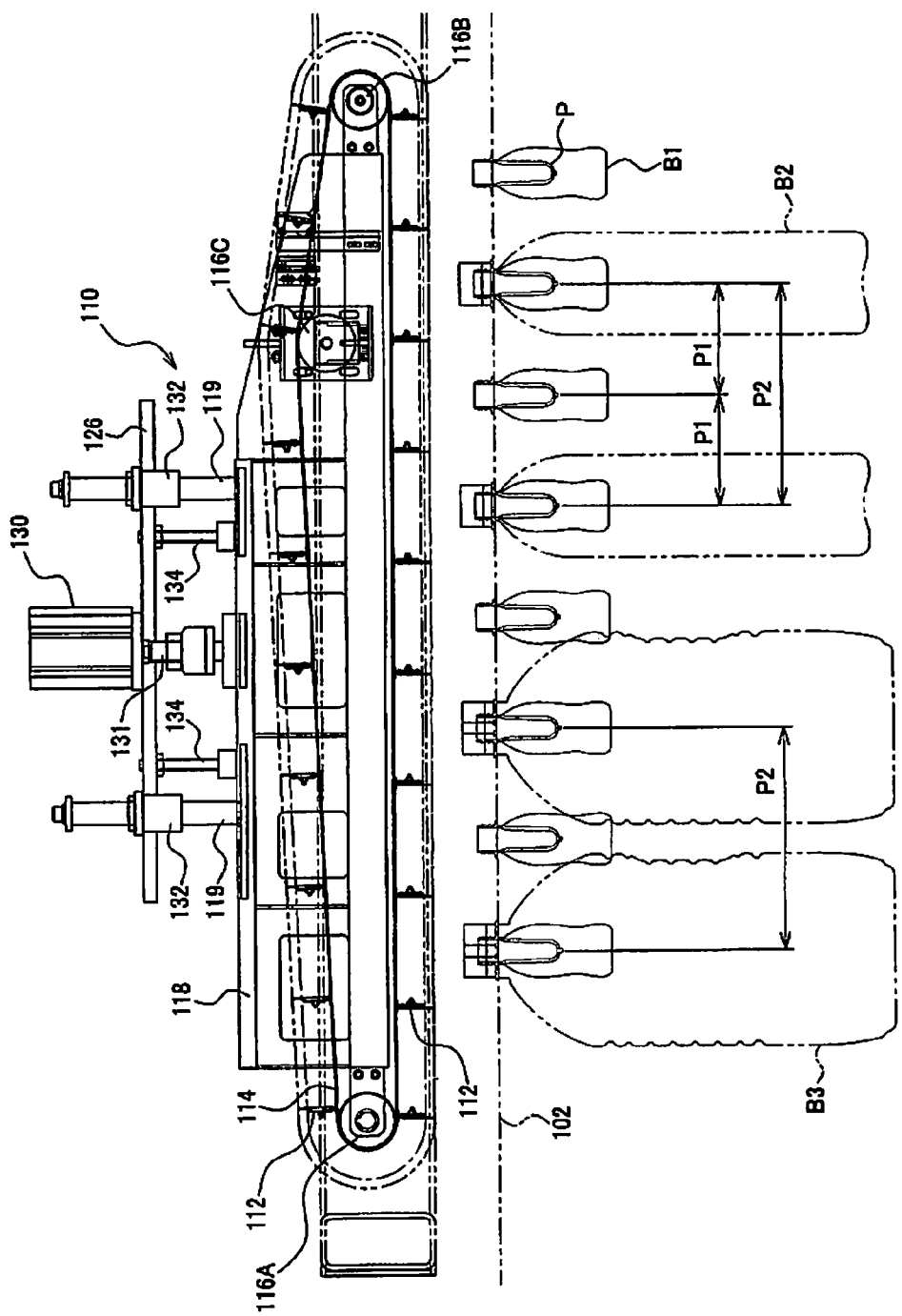
FIG. 3 is a front view of a delivery unit located at a retreat position.
Figure 4:
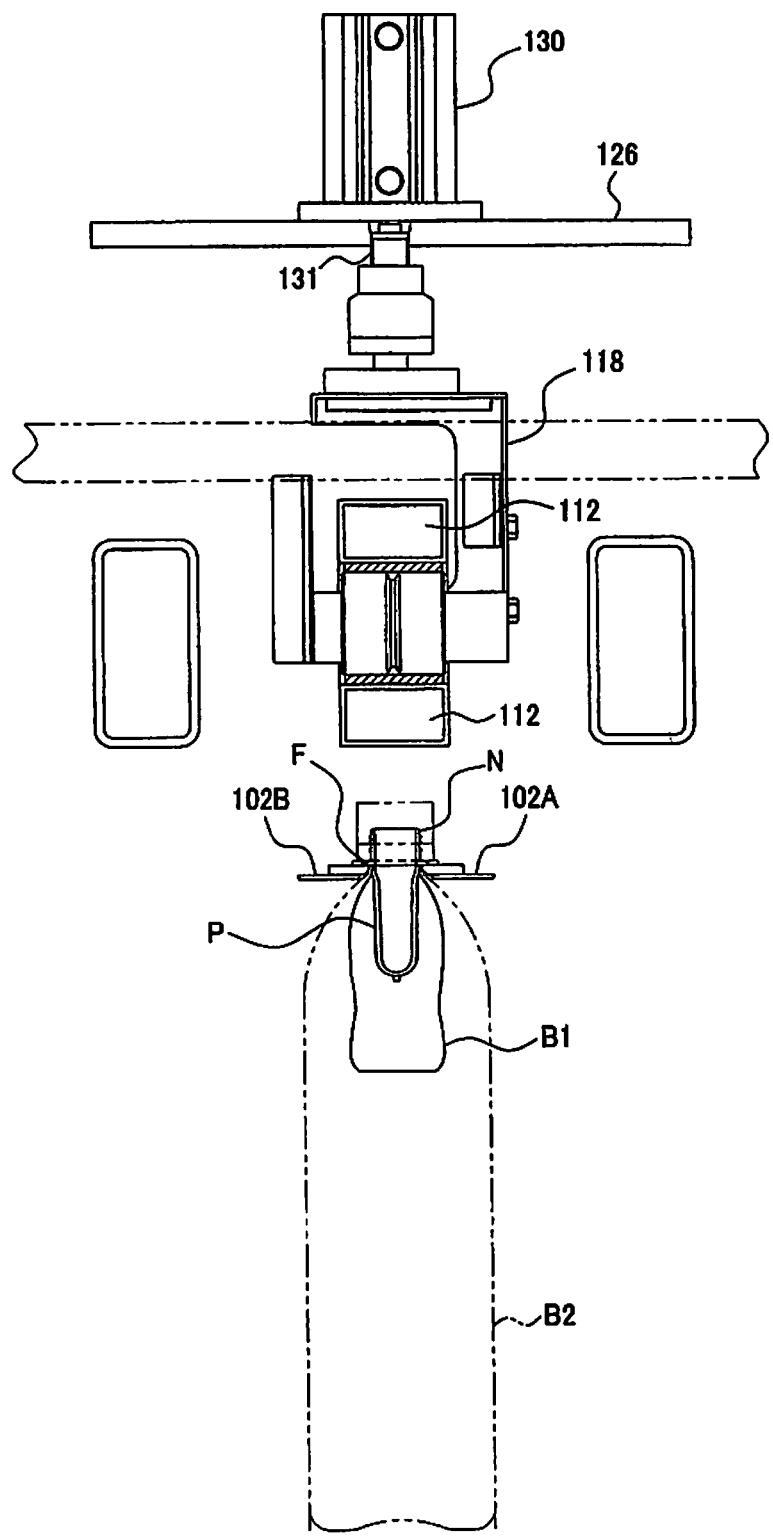
FIG. 4 is a side view of the delivery unit located at the retreat position.
Figure 5:
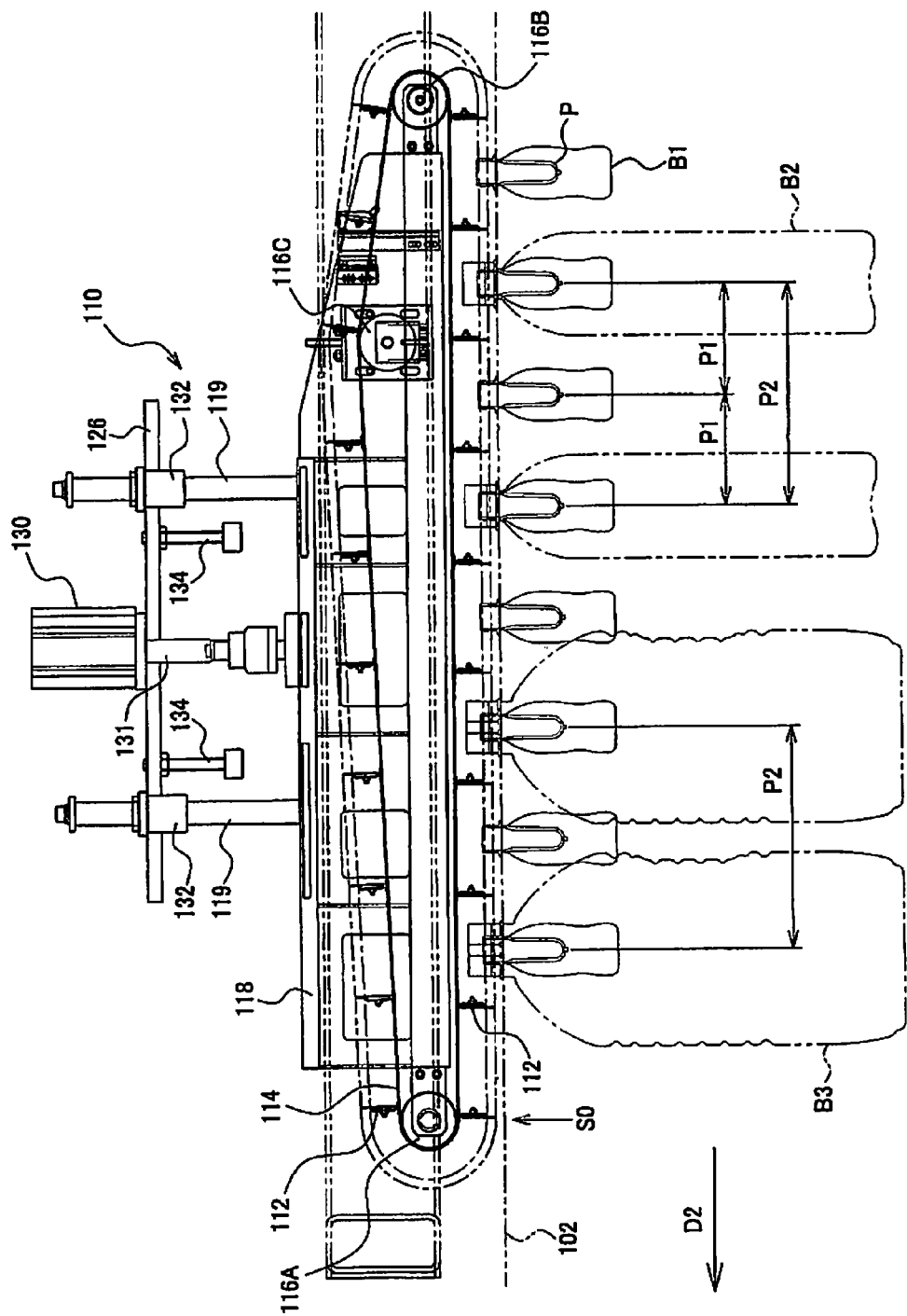
FIG. 5 is a front view of the delivery unit located at a delivery action position.
Figure 6:
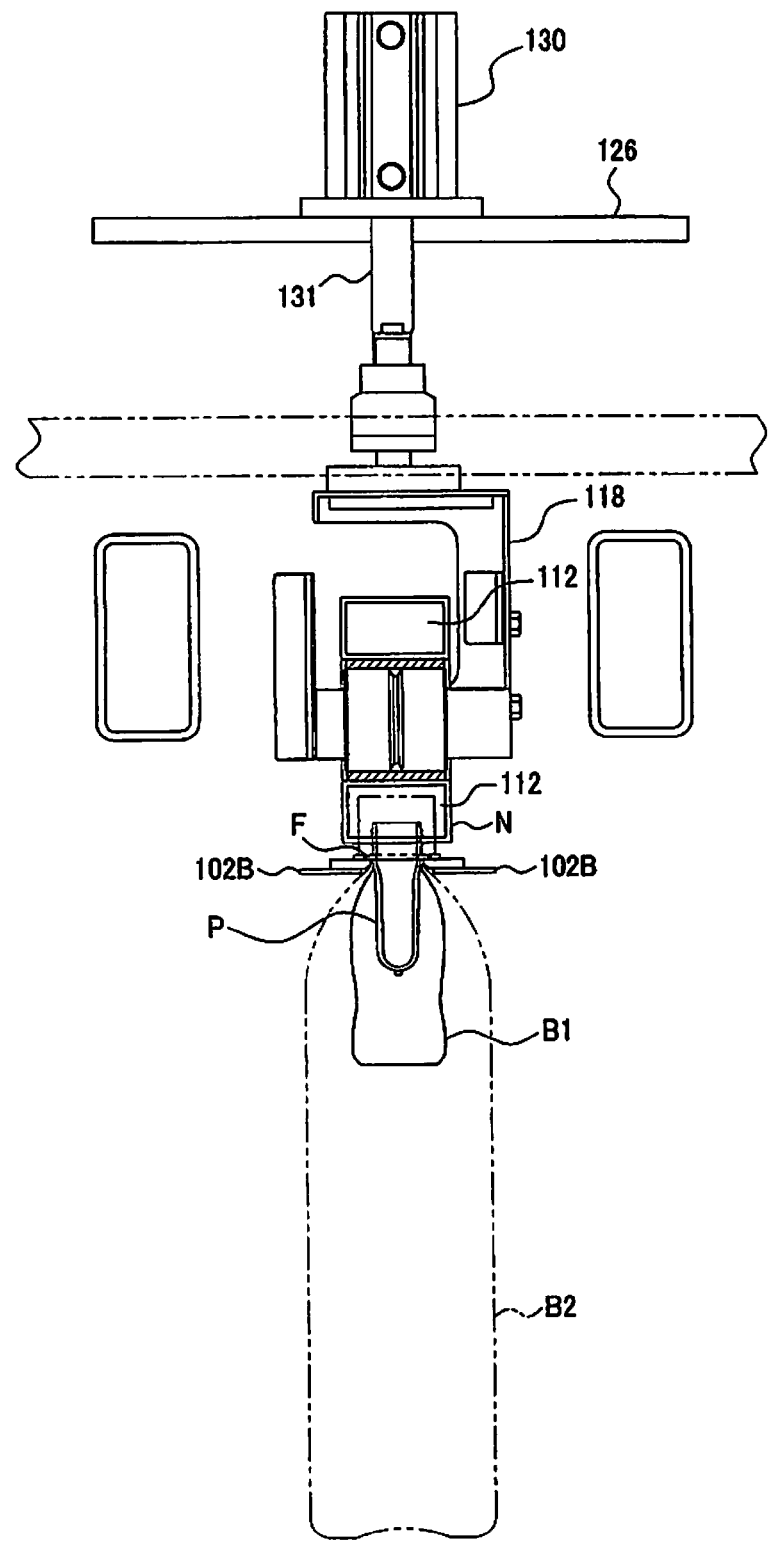
FIG. 6 is a side view of the delivery unit located at the delivery action position.
Figure 7:
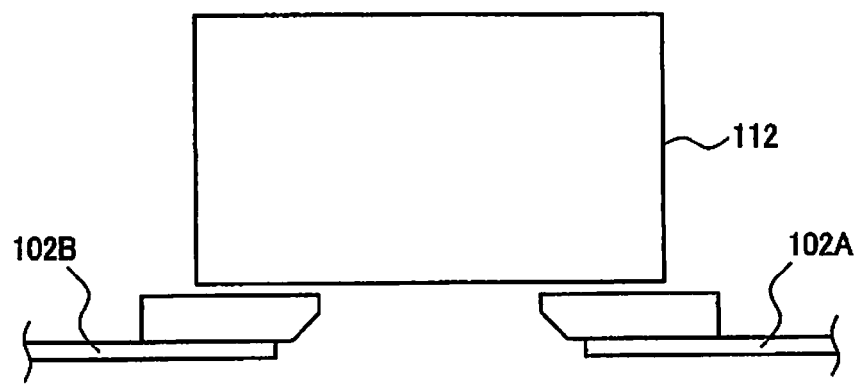
FIGS. 7(A), 7(B) are views showing the relation between a blade and a rail.
Figure 7:
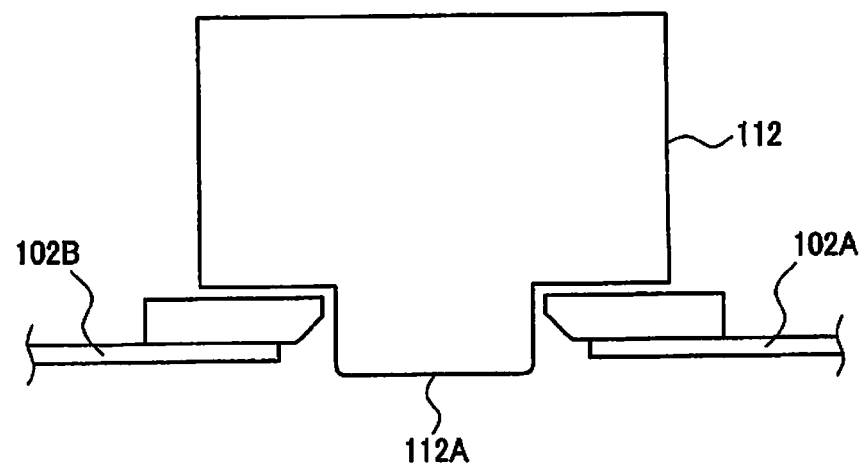

As shown in FIG. 2 to FIG. 6, the delivery unit 100 includes a rail 102 for holding, delivering and guiding the container B (one of B1 to B3), and an elevation block 110 to be raised or lowered relative to the rail 102. The rail 102 has a pair of rail members 102A, 102B which are opposed to each other, and supports from below a flange portion (e.g., support ring) provided in a neck portion N of the bottle B, as shown in FIG. 4 and FIG. 6.

Here, the rail 102 of the delivery unit 100 supports the flange portion F of the bottle B, whereas the arms 21 of the ejection section 20 grip the neck portion N excluding the flange portion F, as shown in FIG. 2. Since the rail 102 does not interfere with the arms 21, as seen here, it is not necessary to open and close the rail 102 with respect to the plurality of bottles B transported to the ejection position within the delivery unit 100 by the arms 21 of the ejection section 20. When the arms 21 are driven to open, at the ejection position, by the air cylinders 22, the bottle B is delivered from the arms 21 to the rail 102. Then, the arms 21 can be moved to return toward the blow molding section 10.

The elevation block 110 includes a plurality of blades 112, a belt (in a broad sense, an endless member) 114 to which the plurality of blades 112 are fixed at the first blow molding pitch P1, and a drive portion, for example, a motor (not shown) for rotationally driving a drive pulley 116A, one of a plurality of pulleys 116A, 116B, 116C over which the belt 114 is passed. The motor drives the belt 114 via the drive pulley 116A to run it. The other two pulleys are a driven pulley 116B, and a tension pulley 116C.

The elevation block 110 can be raised and lowered, with respect to the rail 102, between a retreat position shown in FIGS. 3, 4 and a delivery action position shown in FIGS. 5, 6. For this purpose, an upper stationary platen 120 is provided in the blow molding machine 1, and a height reference plate 122 is fixed below the upper stationary platen 120, as shown in FIG. 2. Below the height reference plate 122, a height adjustment plate 126 is disposed whose height position can be adjusted relative to the height reference plate 122 by the rotation of an adjustment knob 124.

FIGS. 3 to 6 show the elevation block 100 raised or lowered with respect to the height adjustment plate 126. An elevation drive portion, for example, an air cylinder 130, elevation guide portions 132, and stopper rods 134 are arranged on the height adjustment plate 126.

The elevation block 110 has an elevation frame 118 loaded with the blades 112, belt 114, pulleys 116A to 116C, and motor or the like (not shown). A rod 131 of the air cylinder 130 is fixed to the elevation frame 118. Guide shafts 119 to be ascendingly and descendingly guided by the elevation guide portions 132 are also fixed to the elevation frame 118. When the elevation block 110 is located at the retreat position, as shown in FIG. 3, the elevation frame 118 contacts the stopper rods 134, so that the elevation block 110 raised by the air cylinder 130 is maintained at the retreat position.

2.2 Actions of Elevation Unit

When the delivery unit is located above at the retreat position, as shown in FIGS. 3 and 4, the arms 21 moved to the ejection position are driven to open by the air cylinders 22, whereupon the bottle B is delivered from the arms 21 to the rail 102. Then, the arms 21 are moved to return toward the blow molding section 10.

Then, the rod 131 of the air cylinder 130 is pushed down. As a result, the elevation block 110 having the guide shafts 119 ascendingly and descendingly guided by the elevation guide portions 132 is lowered to the delivery drive position shown in FIGS. 5 and 6. By this action, the plurality of blades 112 are arranged at positions upstream, in a bottle delivery direction D2 (FIG. 5), of the neck portion N of the bottle B supported on the rail 102.

In order that the blade 112 is inserted into the height position of the neck portion N of the bottle B, there is provided the height adjustment plate 126 (FIGS. 2 to 6) whose height position relative to the height reference plate 122 can be adjusted by the rotation of the adjustment knob 124 shown in FIG. 2. The height adjustment of the height adjustment plate 126 can be made also when the length or the like of the neck portion N of the bottle B to be blow molded is different.

After lowering of the elevation block 110, the drive pulley 116A is driven by the motor (not shown). As a result, the lower side of the belt 114 of the vertically opposing sides of the belt 114 in FIG. 5 is moved in the direction of the arrow D2 in FIG. 5. The plurality of blades 112 fixed to the lower side of the belt 114 are also moved in the direction of the arrow D2 integrally with the lower side of the belt 114. On this occasion, each of the plurality of blades 112 runs idly for a while, and then contacts the neck portion N of the bottle B. The plurality of blades 112 continue to move in the direction of the arrow D2 integrally with the belt 114. Because of this motion, the plurality of bottles B are pushed by the plurality of blades 112, and transported along the rail 102, with the blow molding pitch being maintained. The blow molding pitch refers to the first blow molding pitch P1 for the small bottles B1, and the second blow molding pitch P2 for the large bottles B2, B3. Thus, the bottles B pushed by the blades 112 do not collide with each other. Nor are the bottles B damaged or deformed.

In the present embodiment, the bottle receiving position S1 (FIG. 1) of the transport device 210 in the filling device 200 shown in FIG. 1 lies downstream, in the delivery direction D2, of a release position S0 (FIG. 5) where the blade 112 separates from the bottle B. In this case, the bottle B separating from the blade 112 at the release position S0 continues to run by an inertial force, arriving at the bottle receiving position S1. The bottle B delivered to the transport device 210 is then transported by the transport force of the transport device 210. The plurality of bottles B pushed by the plurality of blades 112 arrive at the release position S0 and the bottle receiving position S1 at differential times. Thus, even on the side downstream of the release portion S0, the bottles B do not collide with each other, and the bottles B are neither damaged nor deformed.

In the present embodiment, moreover, the drive portion, e.g., motor, for driving the blades 112 and the belt 114 to run can have a rotational speed easily adjusted by an electric current, voltage, pulse number or the like. By so doing, the bottle B being pushed by the blade 112 can be allowed to run stably while maintaining its erected state, without tilting. Furthermore, the speed of the bottle B arriving at the bottle receiving position S1 needs to be within a constant range. However, this speed for arrival is the inertial velocity of the bottle B, so that it depends not only on the speed of the bottle B at the release position S0, but also on the size or weight of the bottle B. In the present embodiment, the motor speed can be adjusted in conformity with the size or weight of the bottle B. Hence, it is easy to ensure the arrival speed within a predetermined range at the bottle receiving position S1.

Since the rod 131 of the air cylinder 130 moves backward after the delivery action, the elevation block 110 is returned to the retreat position shown in FIGS. 3 and 4. Thus, when the bottle B blow-molded subsequently is carried outward to the ejection position, the bottle B does not interfere with the blade 112.

2.3 Relation Between Blade and Rail

FIGS. 7(A), 7(B) show the relation between the rail 102 and the blade 112. In each of the cases shown in these drawings, the blade 112 is required not to interfere with the rail 102. In FIG. 7(A), the lower end of the blade 112 is positioned above the rail 102. Thus, the blade 112 does not interfere with the rail 102. In this case, the blade 112 pushes the neck portion N lying above the flange portion F of the bottle B. In FIG. 7(B), the blade 112 includes a protruding piece 112A inserted between the paired rail members 102A and 102B. In this case, the blade 112 pushes the flange portion F of the bottle B by the protruding piece 112A. By this action, the flange portion F running on the rail 102 is itself pushed. Thus, moment acting on the bottle B is less than in FIG. 7(A), with the result that the posture of the bottle B during travel further stabilizes.

2.4 Support Mechanism for Rail

Figure 8:
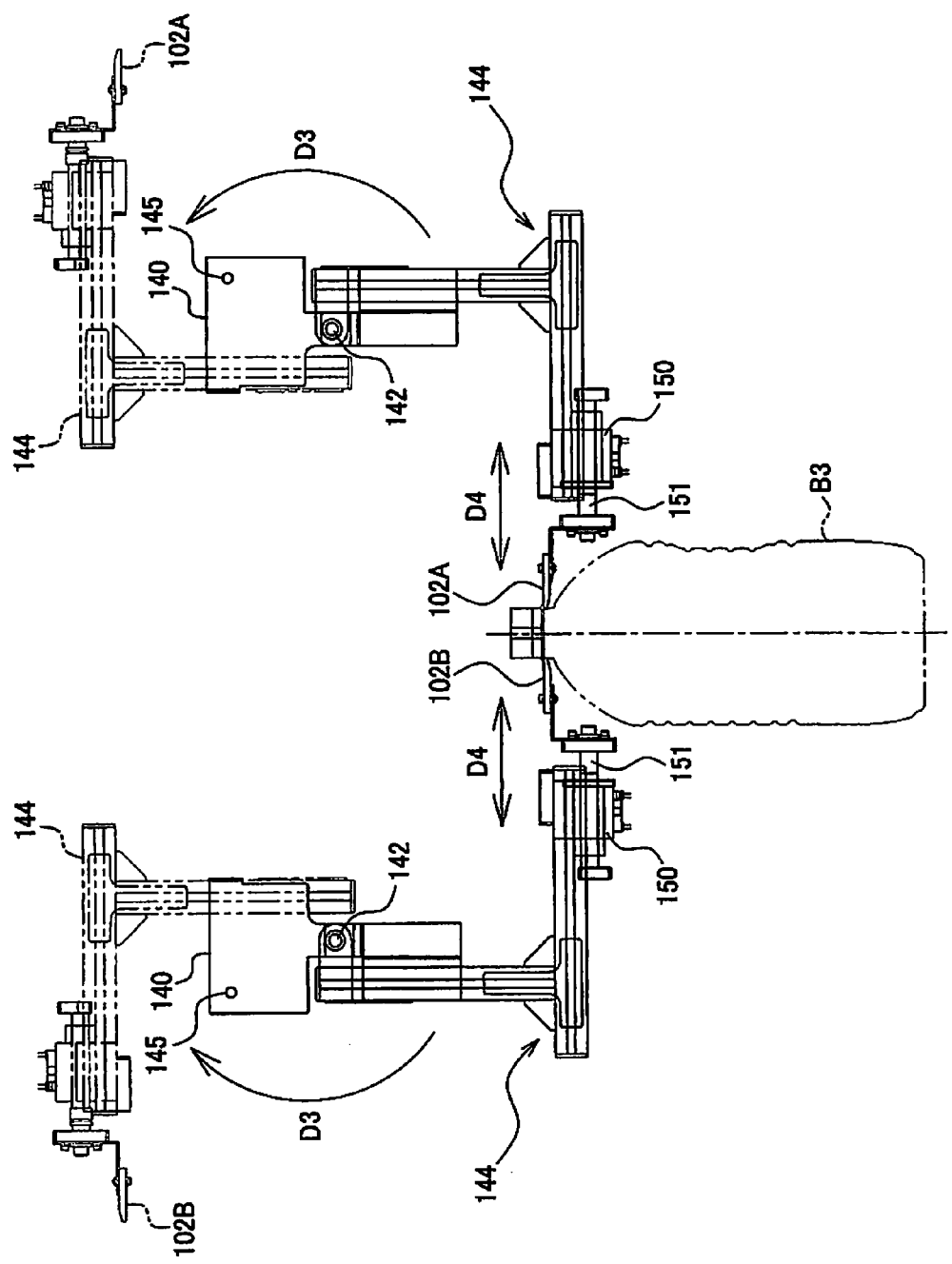
FIG. 8 is a view showing a support mechanism for the rail.

FIG. 8 shows an example of a mechanism for supporting the rail 102. In FIG. 8, two arm support plates 140 are fixed to the blow molding machine 1. One of the paired rail members 102A, 102B is fixed to the free end of a nearly L-shaped arm 144 which is swingable about a swing fulcrum 142 provided on each of the two arm support plates 140.

FIG. 8 shows a state in which the paired rail members 102A, 102B fixed to the two arms 144 indicated by solid lines in FIG. 8 are set at positions enabling the bottle B to run while being guided. The two arms 144 are swung from these positions in the direction of an arrow D3 up to positions indicated by broken lines. Such positions are the retreat positions of the two arms 144.

By setting the two arms 144 at the retreat positions, the paired rail members 102A, 102B do not interfere with the blow cavity mold 11, when the blow cavity mold 11 shown in FIG. 2 is carried out in the direction of the arrow D2 in FIG. 1 for replacement, or when the blow cavity mold 11 is carried inward in a direction opposite to the direction of the arrow D2. Thus, a burden on replacement or maintenance work for the blow cavity mold 11 is lessened.

Moreover, the above-mentioned retreat position is not limited to the position in FIG. 8 at which the arm 144 has been rotated about the swing fulcrum 142 through 180 degrees. In each of the paired arm support plates 140, a hole 145 is provided. After the arm 144 is rotated in the direction of the arrow D3 up to a position beyond the hole 145, a rod-shaped stopper member (not shown) is inserted through the hole 145. The arm 144 has its position fixed on the arm support plate 140 via the rod-shaped stopper member. Since the distal position of the arm 144 (beside the rail 102) is not high, the arm 144 is easily accessible to an operator, and facilitates operation.

2.5 Discharge Action in Delivery Unit

As shown in FIG. 8, each of the paired rail members 102A, 102B can be fixed to a rod 151 which is driven for forward and backward movement by an opening/closing drive portion, e.g., air cylinder, 150 fixed to the arm 144. By so doing, the pair of rail members 102A, 102B can be moved to open and close in the directions of arrows D4.

Figure 9:
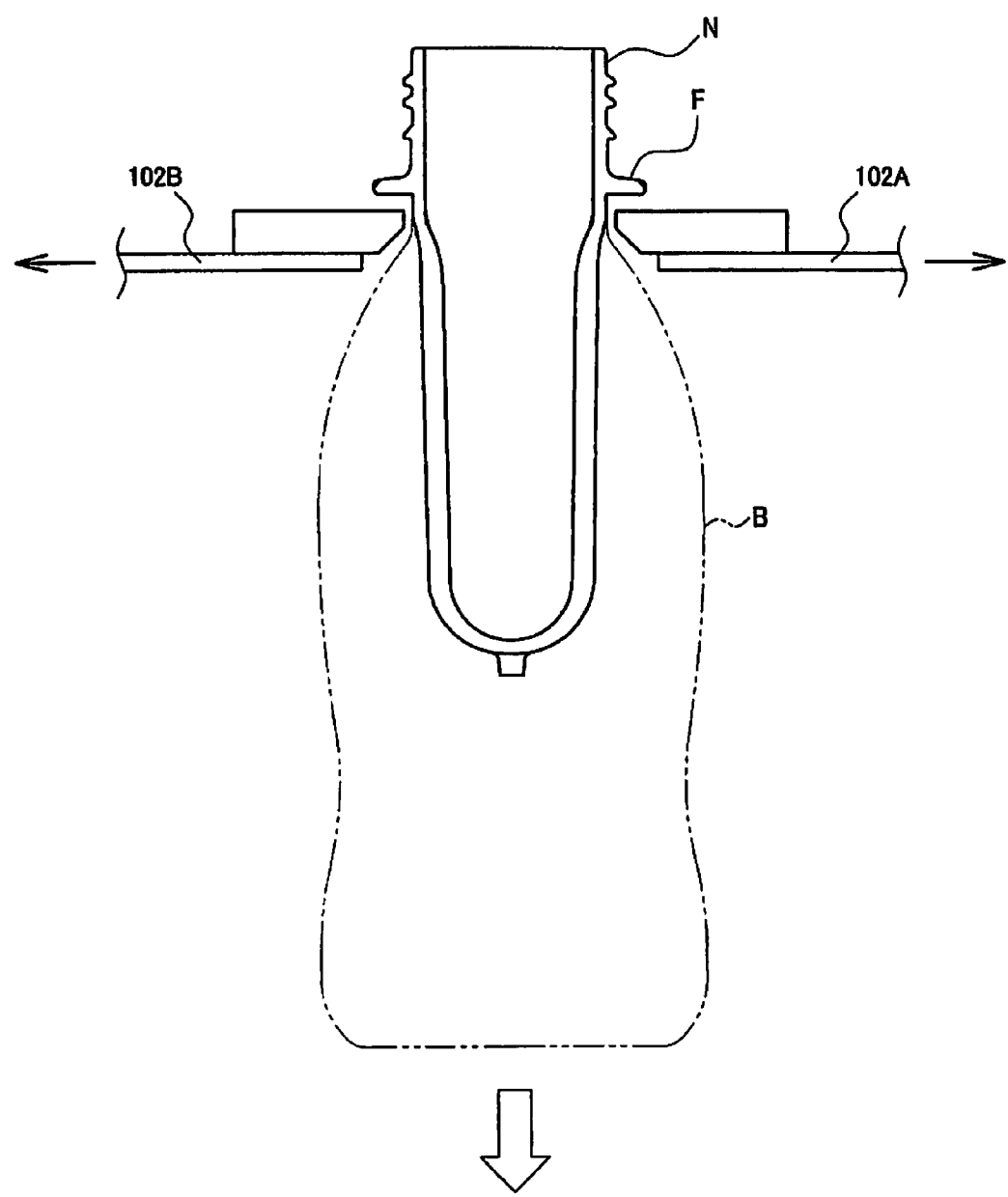
FIG. 9 is a view showing driving of the rail to open it.

During the action of receiving the bottle B from the ejection section 20 onto the rail 102, there is no need to open and close the paired rail members 102A, 102B, as stated earlier. If, at this time, the paired rail members 102A, 102B are opened as shown in FIG. 9, the bottle B is not received by the rail 102, but falls downward. That is, the delivery of the bottle B to the filling device 200 of the post-process is prohibited. The necessity for such a measure arises during the preliminary operation of the blow molding machine 1, or at the time of an abnormality when a molding failure has been considered. Thus, the delivery of the bottle B to the filling device 200 can be prohibited by driving the air cylinders 150 for opening, in response to a signal issued during a preliminary operation, an abnormality signal or the like. During the preliminary operation of the blow molding machine 1, a blow molding action is sometimes not performed. In this case, the preform P, instead of the bottle B, is transported to the delivery unit 100. In this case as well, the pair of rail members 102A, 102B is similarly driven to open, so that the preform P can be discharged without being delivered to the filling device 200.

2.6 Modification of Delivery Unit

In the state where the delivery unit 100 is located above at the retreat position (see FIG. 3), the bottle B supported on the rail 102 may be pulled by static electricity to undergo a positional displacement. For example, the bottle B may be pulled in the direction opposite to the bottle delivery direction D2 (i.e., toward the blow cavity mold 11) by static electricity occurring in the blow cavity mold 11 or the like, with the result that the bottle B may be positionally displaced. If the positional displacement of the bottle B occurs, there is a possibility that the bottles B cannot be transported appropriately by the plurality of blades 112.

Figure 10:
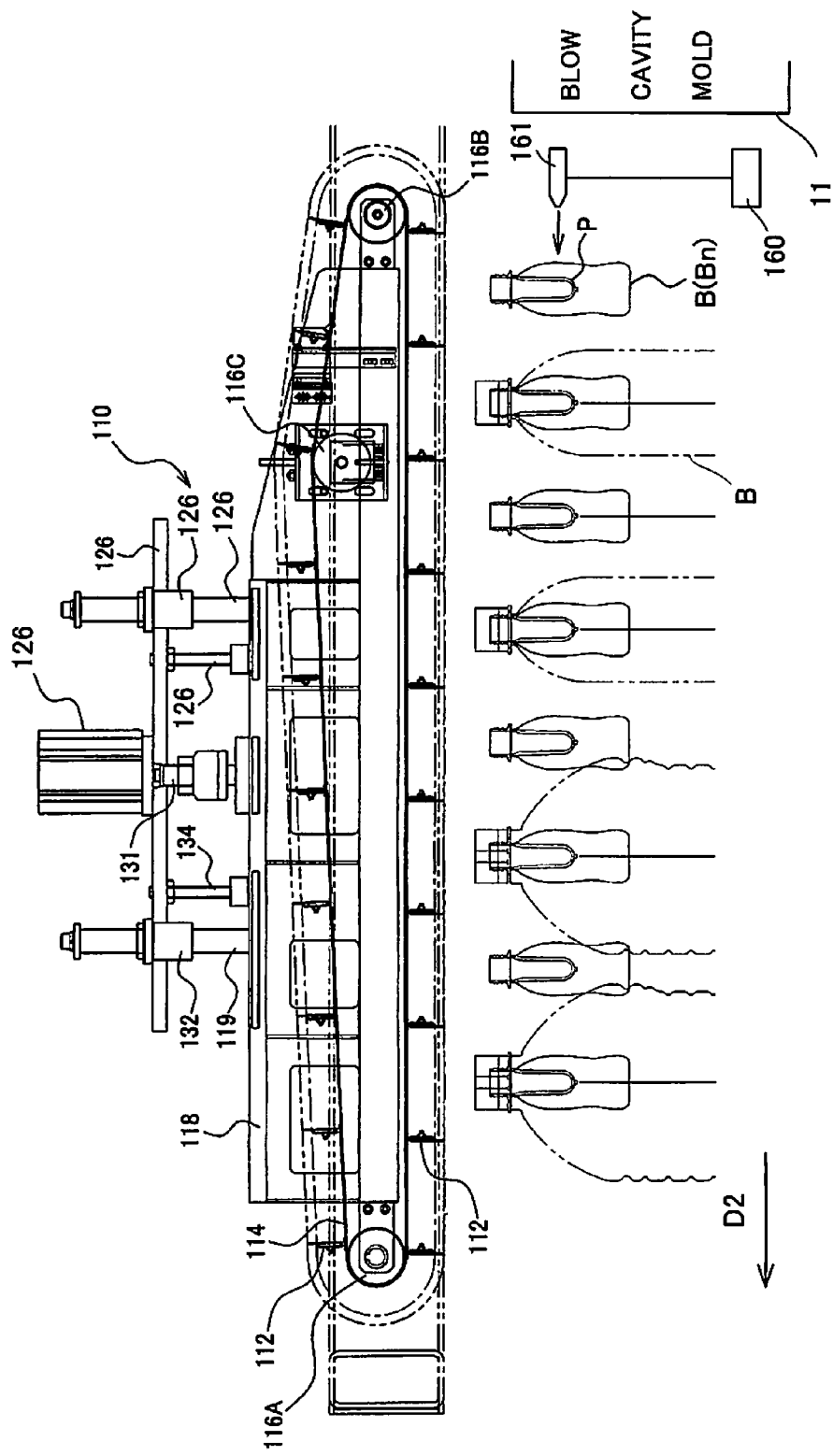
FIG. 10 is a front view showing a modification of the delivery unit.
Figure 11:
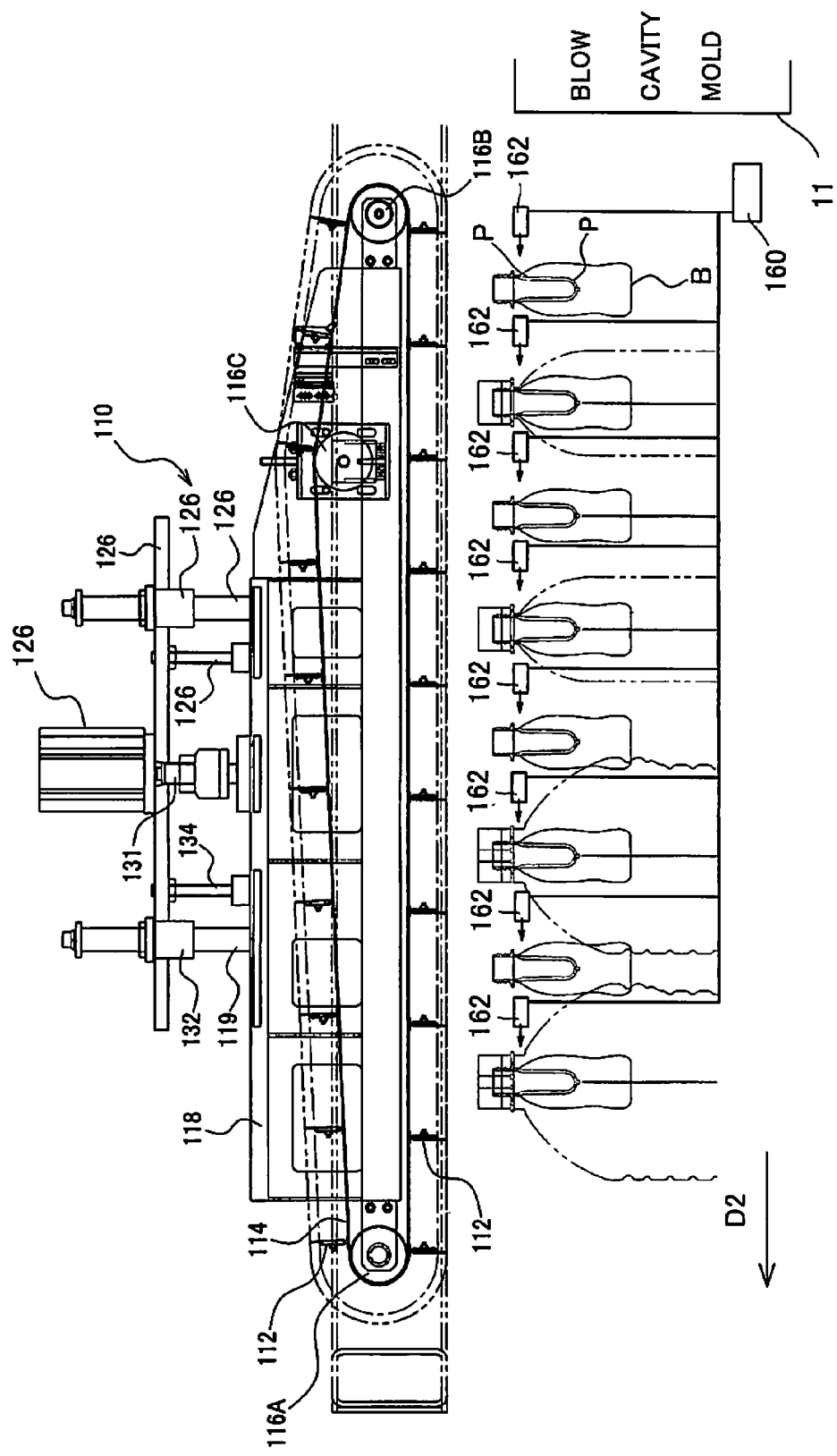
FIG. 11 is a front view showing another modification of the delivery unit.

To solve such problems, an air blow device may be provided in the delivery unit 100. Concretely, a nozzle 161 of an air blow device 160 may be disposed between the bottle B closest to the blow cavity mold 11, i.e., Bn, and the blow cavity mold 11, as shown, for example, in FIG. 10. In this condition, air is blown from the nozzle 161 toward the bottle Bn along the bottle delivery direction D2, as indicated by an arrow in the drawing, whereby the movement of each bottle B due to static electricity can be restrained. Alternatively, nozzles 162 of the air blow device 160 may be arranged on the side, facing the blow cavity mold 11, of each of the plurality of bottles B, as shown, for example, in FIG. 11. More concretely, the plurality of nozzles 162 are fixed to the lower end of each of the paired rail members 102A, 102B to blow air. That is, air is blown from both sides of the rail where each bottle B is placed (in a direction oblique to D2). By this action, the movement of each bottle B due to static electricity can be suppressed more reliably.

3. Blow Molding Machine

Figure 12:
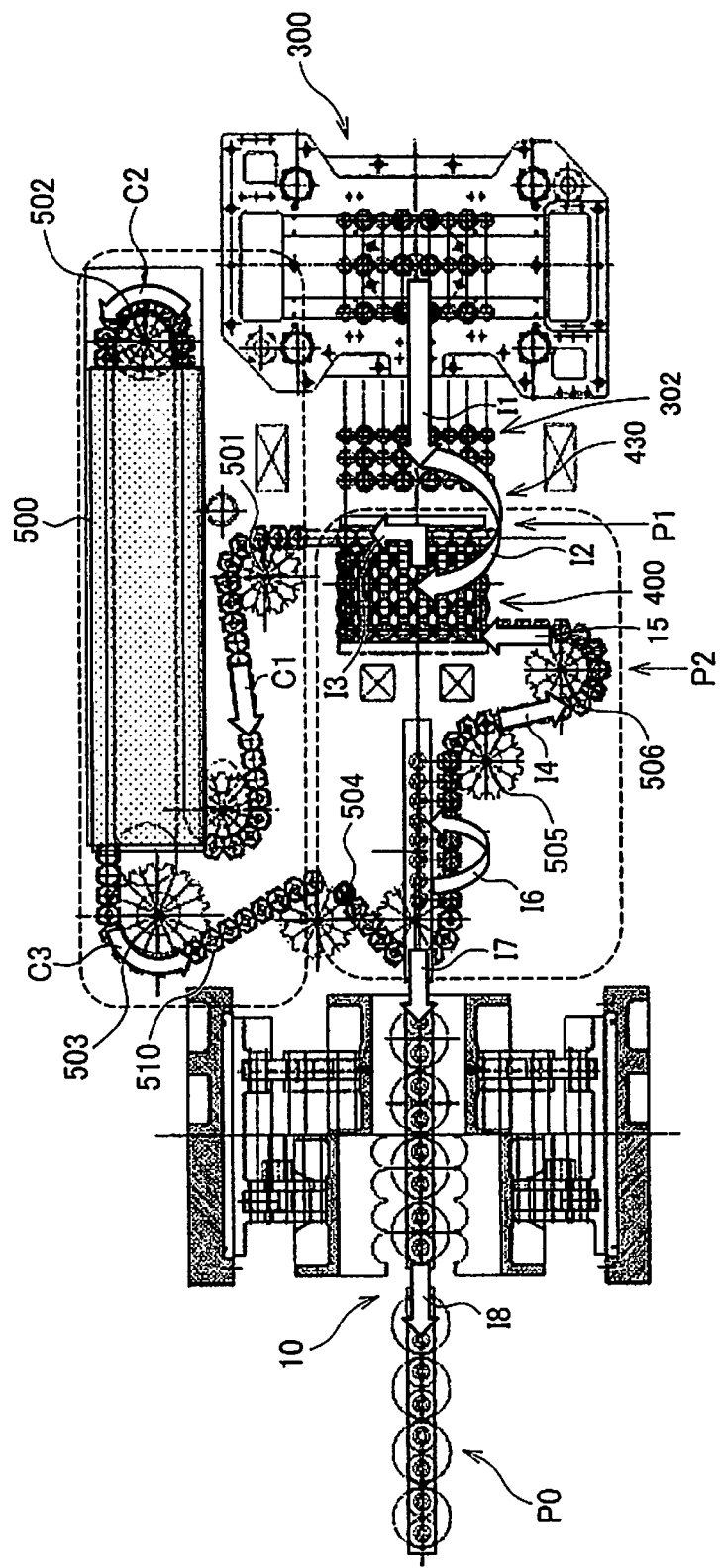
FIG. 12 is a plan view showing an example of the blow molding machine to which the present invention is applied.

An example of the blow molding machine 1 having the above-mentioned delivery unit 100 is shown in FIG. 12. However, the delivery unit 100 is omitted in FIG. 12. The transport actions of the outlines of an injection molding step, a cooling step, a heating step, a blow molding step, and an ejection step for the preform P will be explained by reference to FIG. 12. Details of the apparatus shown in FIG. 12 are the same as those disclosed in WO2012-057016. Of the symbols assigned to arrows in FIG. 12, the arrows I1 to I8 signify intermittent transport, while the arrows C1 to C3 mean continuous transport. That is, the blow molding machine 1 is equipped with a transport section including a continuous transport section for continuously transporting each preform P along the transport path, and an intermittent transport section for intermittently transporting a predetermined number of the preforms P along the transport path.

In an injection molding section 300, N number of (N is an integer of 2 or more) preforms P are injection molded in an upright state in each of a plurality of rows, for example, 3 rows. In the case of the small bottle B1 shown in FIG. 3, N=8 number of the preforms P are injection molded in each row. In the case of the large bottles B1, B2 shown in FIG. 3, N=4 number of the preforms P are injection molded in each row. For the N number, in each of 3 rows, of the preforms P, an ejection device (not shown) holding the preforms P in pots is intermittently transported in the direction of I1. Then, the preforms P are ejected from the pots by a preform transport section, and transferred to a cooling device 400. After the preforms P are held cooled for a constant period of time by the cooling device 400, the cooling device 400 reverses and lowers to deliver the N number of the preforms P, at a time, to each of 3 rows of transport jigs 510. Then, the transport jigs 510 are carried out, one row at a time, toward a heating section 500.

The configuration of an injection molding device provided in the injection molding section 300 will now be described. The configuration of the injection molding device is the same as that described in JP-A-2009-34923, and will thus be explained briefly here.

Figure 13:
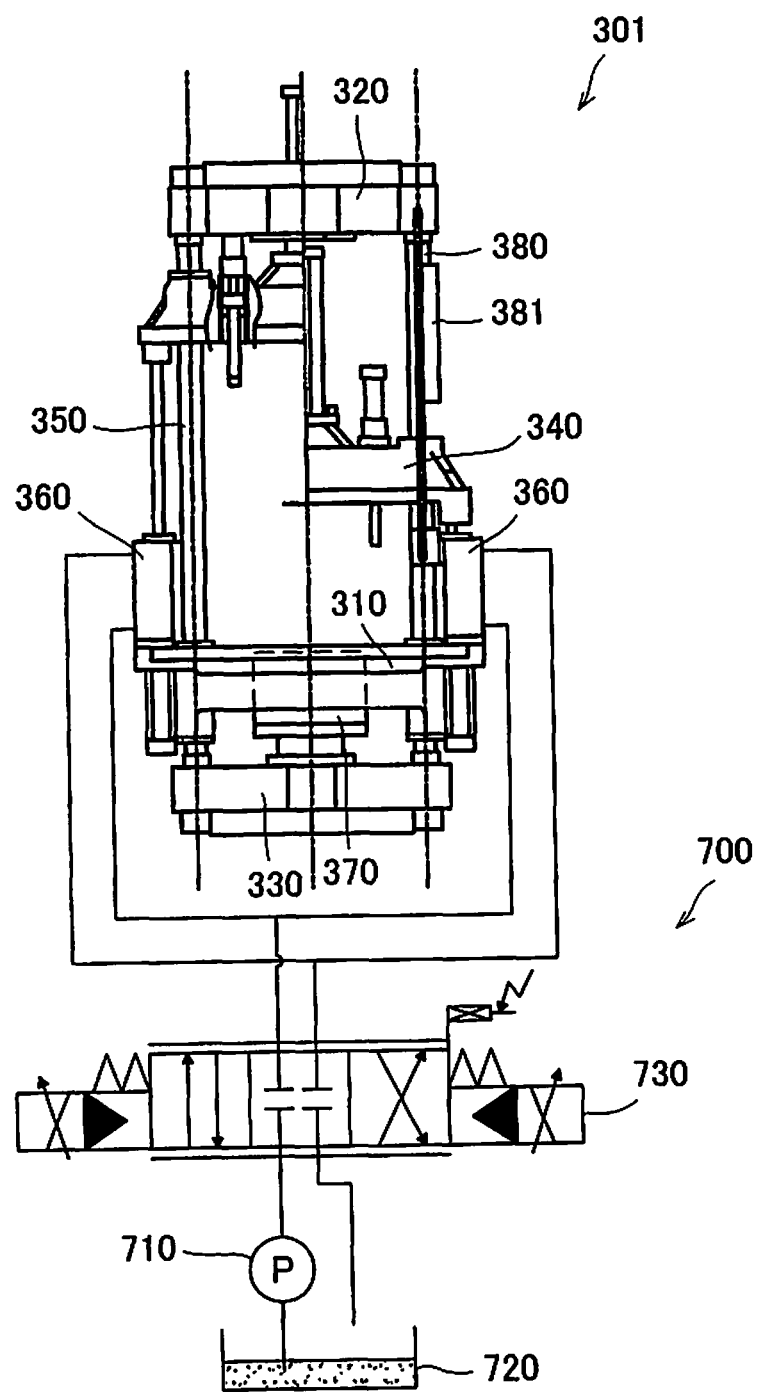
FIG. 13 is a view showing an example of an injection molding machine.

As shown in FIG. 13, an injection molding device 301 provided in the injection molding section 300 is a 4-piece preform injection molding device. The 4-piece refers to a lower base 310, an upper mold clamping plate 320, a lower mold clamping board 330, and a movable board 340. The lower foundation 310 is fixed to an upper part of a machine base (not shown) installed on the floor. The lower foundation 310 supports a plurality of, e.g., four clamp shafts 350 ascendably and descendably via bearings (not shown).

The upper mold clamping board 320 is fixed to the upper end side of the four clamp shafts 350, and ascends and descends integrally with the four clamp shafts 350. The lower mold clamping board 330 is fixed to the lower end side of the four clamp shafts 350, and ascends and descends integrally with the four clamp shafts 350. The movable board 340 is disposed between the lower foundation 310 and the upper mold clamping board 320, and is supported by bearings (not shown) so as to be ascendable and descendable along the four clamp shafts 350.

Also is provided a mold opening/closing drive means 360 which raises and lowers the movable board 340 between a mold opening position and a mold closing position, with the lower foundation 310 as a reference position. That is, the movable board 340 can be raised and lowered by the mold opening/closing drive means (first hydraulic cylinder) 360. There is also provided a mold clamping means (second hydraulic cylinder) 370 which raises and lowers the lower mold clamping board 330, with the lower foundation 310 as the reference position, to raise and lower the four clamp shafts 350 and the upper mold clamping board 320 integrally with the lower mold clamping board 330, thereby setting the descent position of the upper mold clamping board 320 as a mold clamping position.

The mold installed in the injection molding device 301 is composed of a hot runner and an injection cavity mold installed in the lower foundation 310, and a mold unit supported by the movable board 340, but the illustrations of these members are omitted herein.

A linear sensor 381 is fixed to a sensor rail 380 whose upper end is fixed to the upper mold clamping board 320. The linear sensor 381 detects the mold opening position and the mold closing position, and also detects the slowdown position of the movable board 340. Based on the detection results of the linear sensor 381, the oil pressure state of the first and second hydraulic cylinders 360, 370 is adjusted, as appropriate, whereby the movement of the movable board 340 is controlled.

In the present embodiment, a hydraulic circuit 700 for supplying and discharging oil is connected to oil chambers of the first and second hydraulic cylinders 360, 370. For the hydraulic circuit 700, the existing configuration may be adopted (see, for example, JP-A-07-251419), so that its example will be briefly explained here. In the present embodiment, the hydraulic circuit 700 is composed of an oil pump 710 and a tank 720, and a switching valve (high response proportional flow control valve) 730 provided in an oil path between the oil chambers. The switching valve 730 is an electromagnetically driven switching valve equipped with an input port connected to the oil pump 710, and a drain port leading to the tank 750.

Figure 14:
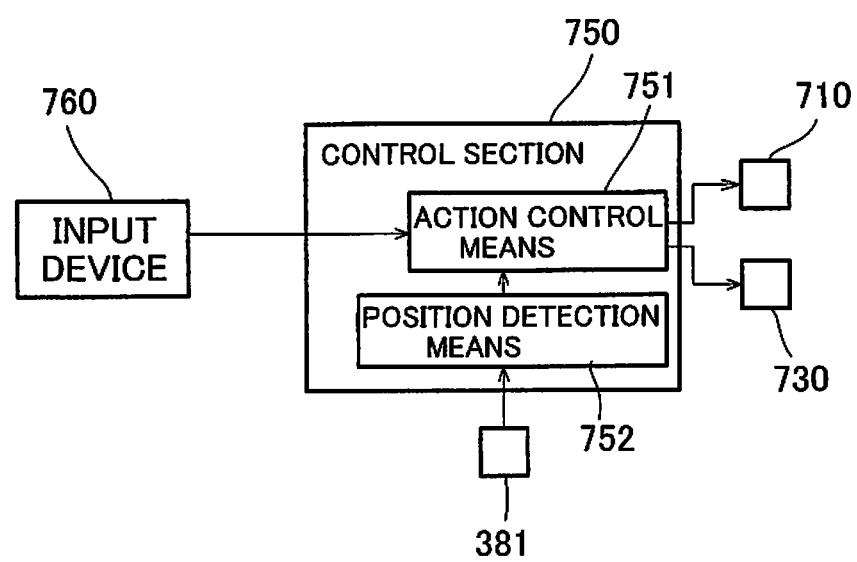
FIG. 14 is a block diagram showing the schematic configuration of the injection molding machine.

The actions of the oil pump 710 and the switching valve 730 constituting the hydraulic circuit are controlled by a control section. As shown in FIG. 14, a control section 750 has an action control means 751 which controls the actions of the switching valve 730, etc. based on set information entered from an input device 760. The set information is, for example, information which needs to be set for determining a mold opening/closing speed or the like. For example, the set information is inputted by an operator operating the input device 760 composed of a touch panel or the like. The control section 750 also has a position detection means 752 for detecting the position of the movable board 340 or the like based on the detection results of the linear sensor 381. The action control means 751 controls, as appropriate, the actions of the switching valve 730, etc. based on the detection results of the position detection means 752 as well as the above set information. The control section 750 controls the actions of the switching valve 730, etc. in this manner, thereby appropriately adjusting the mold opening/closing speed in the injection molding machine 301.

With conventional machines, it has been impossible to make delicate adjustment of the mold opening/closing speed in the injection molding machine. This is because an increase in the mold opening/closing speed causes great moment to the mold, imposing a burden on the machine side. A decrease in the mold opening/closing speed, on the other hand, has posed the problem of decreased productivity.

With the injection molding machine 301 according to the present embodiment as described above, by contrast, the use of the switching valve (high response proportional valve) 730 and linear sensor 381 at relatively low costs makes it possible to effect the delicate adjustment of the mold opening/closing speed that has been difficult with the conventional machines.

Figure 15:
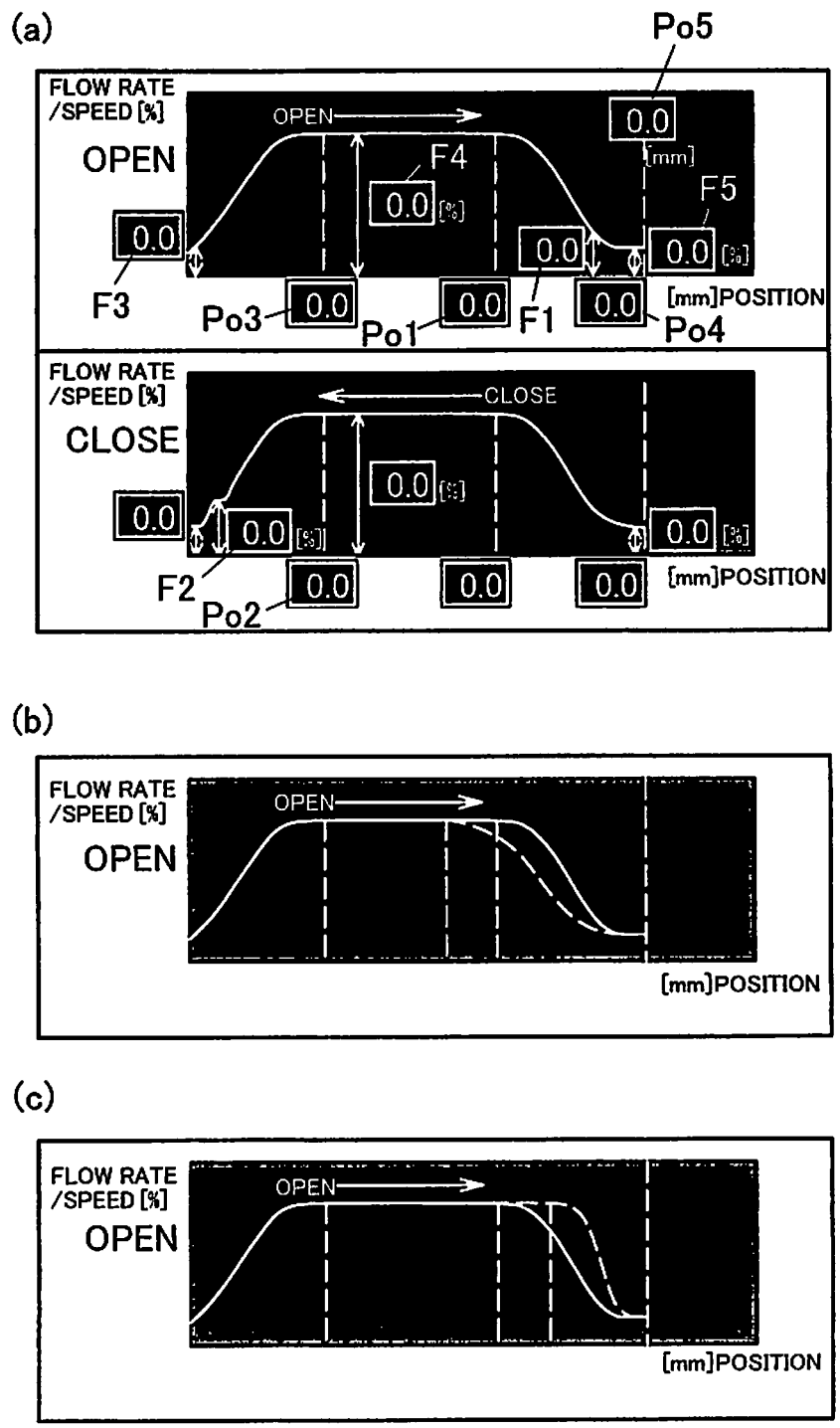
FIGS. 15($a$) to 15($c$) are views showing an example of screens of an input device constituting the injection molding machine.

As shown in an example of the setting screen of the input device 760 in FIG. 15(a), for example, the operator enters, at least as set information, a mold position Po1 where mold opening at a maximum flow rate is completed and speed reduction starts, and an oil flow rate F1 at a position where arbitrary mold opening speed reduction ends (e.g., Po4), in connection with the mold opening action. In connection with the mold closing action as well, the operator similarly enters a mold position Po2 where mold closing at a maximum flow rate is completed and speed reduction starts, and an oil flow rate F2 at a position where arbitrary mold closing speed reduction ends. By these measures, an optimum speed (flow rate) curve is calculated based on predetermined functions by the action control means 751, and drawn on the screen of the input device 760.

In slowing down the opening/closing action, it is recommendable to render the speed-down position closer to the start position, and decrease the flow rate/speed, for example, as a speed curve is indicated by a dashed line in FIG. 15(b). FIG. 15(b) shows the speed curve in the mold opening action, but the same can be said of the mold closing action. If it is desired to hasten the opening/closing action, on the other hand, it is recommendable to render the speed-down position closer to the stop position, and increase the flow rate/speed, for example, as indicated by a dashed line in FIG. 15(c). Even in such a case, a burden on the machine side is less than in the conventional machines, and noises can also be kept down.

According to the present embodiment, in connection with the mold opening action, for example, pieces of set information, such as an initial flow rate F3 at start of injection mold opening, a position Po3 where mold opening at a maximum flow rate is started after start of mold opening, a maximum flow rate F4 during injection mold opening, a position Po4 where mold opening speed reduction is terminated, a flow rate F5 during a period from completion of mold opening speed reduction until complete opening of the mold, and a position Po5 of mold opening conformed to a molded article, are automatically set by the action control means 761. However, these pieces of set information may, needless to say, be set manually by the operator.

Figure 16:
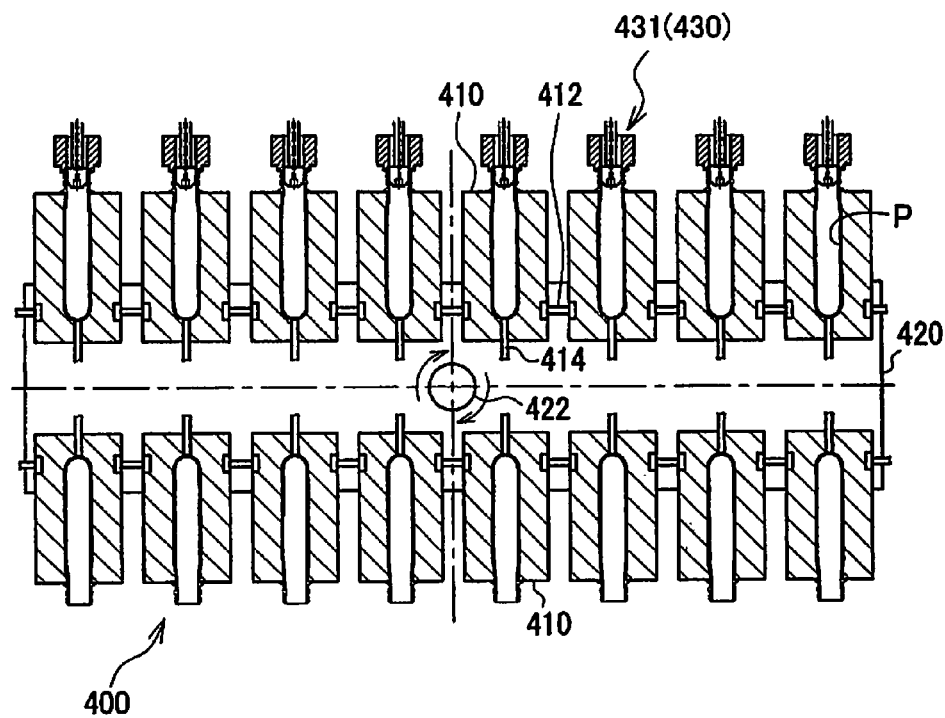
FIG. 16 is a view showing a cooling section having a preform discharge function.

The preform P injection molded in the injection molding section 300 of such a configuration is delivered to the cooling section 400 shown in FIG. 16 via a transport device (not shown). The preform P is reversed in the direction of I2 in the cooling section 400 to be brought into an inverted state, and the N number of preforms P are loaded, at a time, onto 3 of the transport jigs 510 each having the transport member 511 shown in FIG. 17.

The transport jig 510 is intermittently transported in the direction of an arrow I3, and carried out onto a continuous transport path. On the continuous transport path, a plurality of the transport jigs are continuously transported along the directions of arrows C1, C2, C3 by the driving force of continuous drive sprockets 501, 502, 503 (continuous transport section). During this process, the preform P undergoes heating, while revolving on its axis, with a heater provided in the heating section 500.

The transport jig 510 in engagement with the continuous drive sprocket 503 is intermittently returned in the directions of I4, I5, at a faster speed than in continuous transport, by the intermittent driving of intermittent drive sprockets 504, 505 (intermittent transport section).

A predetermined number of the preforms P intermittently transported by the intermittent transport section are transferred to the blow molding section 10 by the transfer section. In the transfer section, N number of transport arms (not shown) are used to transport N number of the preforms P from the heating section 500 to the blow molding section 10. The actions of the transport arms are to eject from the transport jigs 510 the N number of preforms P in an inverted state, and reverse them in the direction of an arrow I6 in FIG. 12 to bring them into an upright state. Then, the preform P is delivered from the transport arms to the pair of arms 21 shown in FIG. 1, and carried into the blow molding section 10 (see an arrow I7 in FIG. 12). In other words, in the blow molding section 10, the N number of preforms P injection molded in the injection molding section 300 are fed dividedly n times (n is an integer of 2 or more) such that M number of the preforms P (M=N/n, M is a natural number) are stretch blow molded, at a time, to form M number of products.

It is permissible to ready two sets of eight pairs of arms 21/set and simultaneously perform the action of carrying the preforms P into the blow molding section 10 (the action indicated by an arrow I7 in FIG. 12), and the action of carrying the bottles B after blow molding out to the ejection position P0 (the action indicated by an arrow I8 in FIG. 12). The bottles B transported to the ejection position P0 are delivered to the filling device 200 of the post-process by the aforementioned delivery unit 100.

Discharge of the preform P not blow molded can be performed even at a location other than the delivery unit 100. Two positions, P1 and P2, indicated in FIG. 12 represent the positions where the discharge action for the preform P can be performed. The position P1 shown in FIG. 12 refers to the cooling section 400 shown in FIG. 16, and the position P2 shown in FIG. 12 is the intermittent transport position of the transport jig 510 having the transport member 511 shown in FIG. 17.

Figure 17:
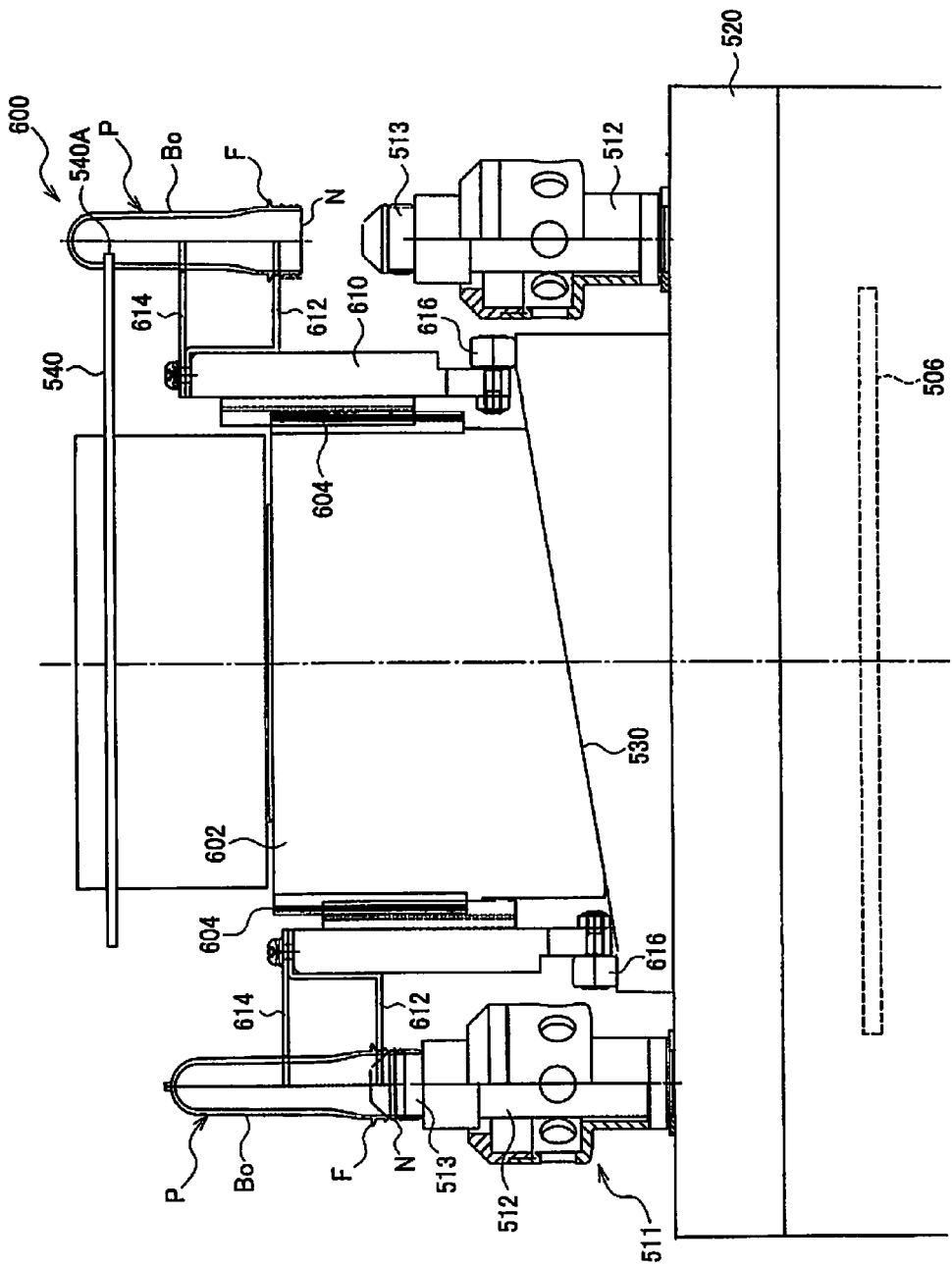
FIG. 17 is a view showing a preform carry-out device provided at an intermittent transport position.

The cooling section 400 can have a total of 48 cooling pots 410, i.e., 16 of the cooling pots per row when viewed in a cross section, and a reversal portion 420 supporting the cooling pots 410, as shown, for example, in FIG. 17. The cooling pot 410 is cooled with a cooling medium circulating through a cooling medium passage 412. The cooling pot 410 has a suction hole 414 for sucking the preform P to attract it to the inner surface of the pot. The reversal portion 420 can be reversed about a shaft 422. The preform P ejected from the injection molding section 300 is suction held, for example, by a suction holding portion 431 of a preform transport device 430 shown in FIG. 16, and transported to the cooling section 400, where the preform P is delivered to the cooling pot 410. The cooling pot 410 cools the preform P in an upright state before the reversal portion 420 is driven, and in an inverted state after the reversal portion 420 is driven.

The reversal portion 420 enables the preform P to be dropped by stopping suction in the suction hole 414, or ejecting air from the suction hole 414, when the preform P is in an inverted state. Such dropping control over the preform P is utilized, for example, at the time of stopping the operation based on an injection molding failure (in the event of an abnormality). Since an unnecessary preform does not need any more to be sent to a subsequent transport path, the working efficiency of molding is improved.

At the intermittent transport position P2 in FIG. 12, on the other hand, a preform carry-out device (carry-out section) 600 can be provided. During a normal operation, the preform P is reversed after being ejected from the transport jig 510 at the reversal section as shown by an arrow I6 in FIG. 12, and is delivered to the pair of arms 21 for transport to the blow molding section 10. Thus, the preform P is not transported to the intermittent transport position P2. In a preliminary operation to be described later, however, the preform P is transported up to the intermittent transport position P2 without being transported to the blow molding section 10 at the transport section.

The transport member 511 provided on the transport jig 510 intermittently transported at the intermittent transport position P2 has a holding portion 513, which is inserted into the neck portion N, the holding portion 513 being fixed to an upper end part of an autorotation shaft 512 to be driven so as to revolve on its own axis in the heating section 500, as shown in FIG. 17. The lower end side of the autorotation shaft 512 is guided by the rail 520, and is also rotationally guided by a driven sprocket 506.

The preform carry-out device (carry-out section) 600 has a rotating shaft 602 rotating together with the driven sprocket 506. At a plurality of locations in the circumferential direction of the rotating shaft 602, elevation guide rails 604 are fixed. Elevation members 610 to be guided upwardly and downwardly movably by the elevation guide rails 604 are provided, and two arms 612,614 extending horizontally are fixed to the elevation member 610. The arm 612 is disposed below the flange portion F of the preform P being intermittently transported, while the arm 614 supports a barrel portion Bo of the preform P.

Onto the rail 520, an end cam 530, for example, is fixed as a drive portion for driving the elevation member 610 to move upwardly and downwardly. The elevation member 610 is provided with a cam follower 616 to be brought into contact with the end cam 530. While the preform P and the elevation member 610 are moving half around the periphery of the driven sprocket 506, the elevation member 610 is pushed upward by the end cam 530. By this action, the arm 612 pushes up the flange portion F of the preform P, whereby the neck portion N of the preform P is released from the holding portion 513 of the transport member 511.

At the intermittent stop position P2 is further disposed a push-down member 540 protruding in an upper region of the preform P released from the transport member 511. A leading end part 540A of the push-down member 540 interferes with the barrel portion Bo of the preform P to impart to the preform P an external force pushing down the preform P. On this occasion, a centrifugal force acting on the preform P is also utilized, whereby the preform P can be dropped outside the blow molding machine 1 and discharged. The push-down member 540 may be driven to move forward and backward.

The discharge of the preform P at the intermittent transport position P2 can be performed during a preliminary operation, for example, in setting the molding conditions. This enables the heated preform P to be discharged before being transported to the blow molding section 10. In this manner, the preform P is discharged without passing through the blow molding section 10, so that work efficiency is increased.

If the injection molding cycle time or the blow molding cycle time is changed during the normal operation, the preform P is discharged by the preform carry-out device (carry-out section) 600 located at the intermittent transport position P2.

With the structure of the present embodiment, within one cycle time for injection molding of 3 rows×N number of preforms P, a blow molding step for N number of bottles B is implemented 3 times. That is, the injection molding cycle time is set to be 3 times or more the blow molding cycle time. If the injection molding cycle time is less than 3 times the blow molding cycle time, it becomes impossible to blow mold all the preforms P. Thus, redundant preforms P on the transport path are discharged by the preform carry-out device (carry-out section) 600. The injection molding cycle time may be determined, as appropriate. For example, it is set at the same period of time as the time interval for insertion of the ejection device (pot) which is placed into and out of the injection molding section 300 for the carry-out of the molded preforms P. When 8000 of preforms per hour are to be molded using an injection mold equipped with 3 rows×8 cavities, the injection molding cycle time is about 10.8 seconds (3600 seconds/(8000/(3×8))). At intervals of this time, the ejection device is loaded into and unloaded from the injection molding section 300. Within this period of time, moreover, preform transfer from the cooling section 400 to the transport jigs 510 has to be completed. That is, the plurality of (3 rows in the present embodiment) transport jigs 510 relevant to the previous injection molding cycle need to be carried out toward the heating side, while the same number of empty transport jigs 510 should be kept in a wait state below the cooling section 400. As for the speed of the transport jig 510, if the entire length of the transport jigs 510 bearing the blow batch number (N, 8 in the present embodiment) of preforms P is 500 mm, it follows that the transport jigs 510 are made to proceed over the distance corresponding to the 3 rows (500×3) within 10.8 seconds. Concretely, the transport jig speed takes a value of about 138.9 mm/second (500 mm×3/10.8 seconds). A speed change to the transport jigs 510 being continuously transported is effected by the continuous rotation drive sprockets 501, 502, 503. The injection cycle time has a close relation to the amount of production. That is, a reduction in the injection molding cycle time leads to an increase in the production amount of the preforms P and, eventually, the bottles B. Prolongation of the injection molding cycle time, conversely, results in a decreased production volume.

Furthermore, the blow molding cycle time, with this injection molding cycle time being maintained, is determined to have an upper limit value of about 3.6 seconds, because these preforms P are divided into 3 batches and blow molded.

During the molding operation, the injection molding cycle time changed by shortening or prolongation is newly inputted using an input device for the injection molding cycle time. As a result, the transport speed for the preform P is changed by the control section (change means) for controlling the blow molding machine 1. In accordance with this action, various operating instruments within the molding machine, such as the ejection device and the preform transport device, are also automatically changed in the operating conditions and time.

As stated above, the predetermined number of preforms P are intermittently transported to the transfer section. For example, if the injection molding cycle time is updated to a shorter time (from 10.8 seconds to 10.5 seconds) in order to increase the production quantity, the transport speed is changed from about 138.9 mm/second to about 142.9 mm/second accordingly. In this case, at a timing at which the transfer section transfers the preform P to the blow molding section 10, some of the predetermined number of preforms P may be transported beyond the transfer section. That is, in the present embodiment as mentioned above, if the injection molding cycle time is less than 3 times the blow molding cycle time, the transport of the preform P does not match the timing of transfer in the transfer section, and it becomes impossible to blow mold all the preforms P.

Whether or not the preform P is transported beyond the transfer section at a predetermined timing as described above is detected by a transfer timing detection section provided upstream of the transfer section, concretely, at a predetermined position of the drive sprocket 504.

In such a case, the rotational speed of the drive sprocket 504 is rendered higher than that at the ordinary transfer speed so that the predetermined number of preforms P are intermittently transported to the preform transport device (carry-out section) 600 at the intermittent transport position P2 via the driven sprocket 505 moving in synchronism with the drive sprocket, and they are discharged from the transport path at the carry-out section (automatic discharge function). If the blow molding cycle time is changed to 3.7 seconds on the input device side for the purpose of adjusting the molding conditions when the injection molding cycle time is 10.8 seconds, the timing of transfer in the transfer section is similarly delayed. In this case as well, the aforementioned automatic discharge function is performed, so that the machine is not stopped. In this manner, with the blow molding machine 1 in continuous operation, the injection molding cycle time or the blow molding cycle time can be changed.

If the injection molding cycle time or the blow molding cycle time is changed, moreover, it is preferred to further change the output of the heater of the heating section 500 in accordance with the change. If the injection cycle time is shortened, for example, the transport speed of the preform P is also increased. This means that the heating time of the preform P becomes shorter than before change. This difference in the molding conditions poses a great problem in obtaining a homogeneous molded product. Thus, after a change in the transport speed, a fall in the temperature of the preform P having passed the heating section 500 is detected, and the detected value is given as feedback to increase the heater output, thereby attaining a state where continuous operation is possible under the same molding conditions. By this procedure, the preforms can be heated at a more appropriate temperature in the heating section 500, and the quality of containers formed by blow molding can be improved.

Figure 18:
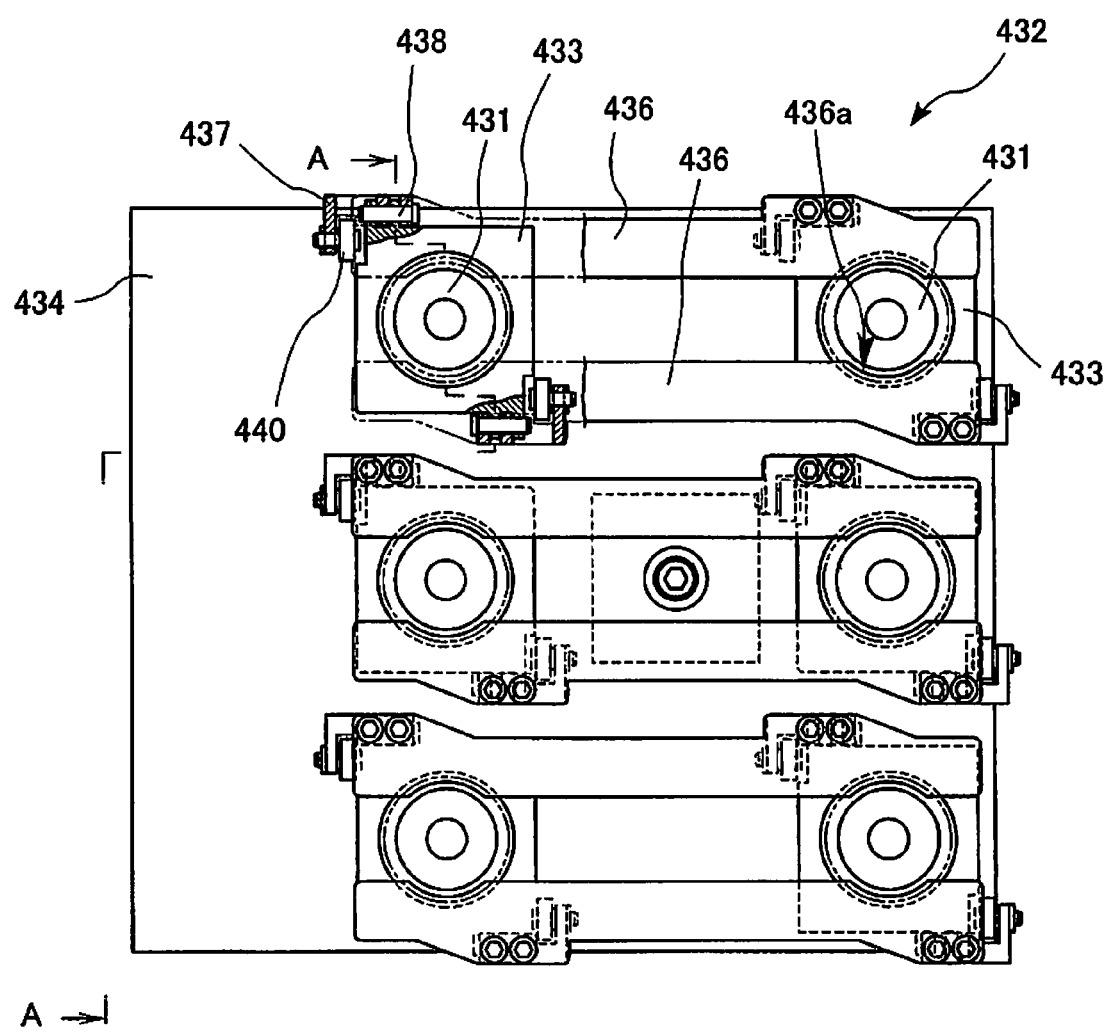
FIG. 18 is a bottom view showing a grip mechanism portion of a preform transport section.
Figure 19:
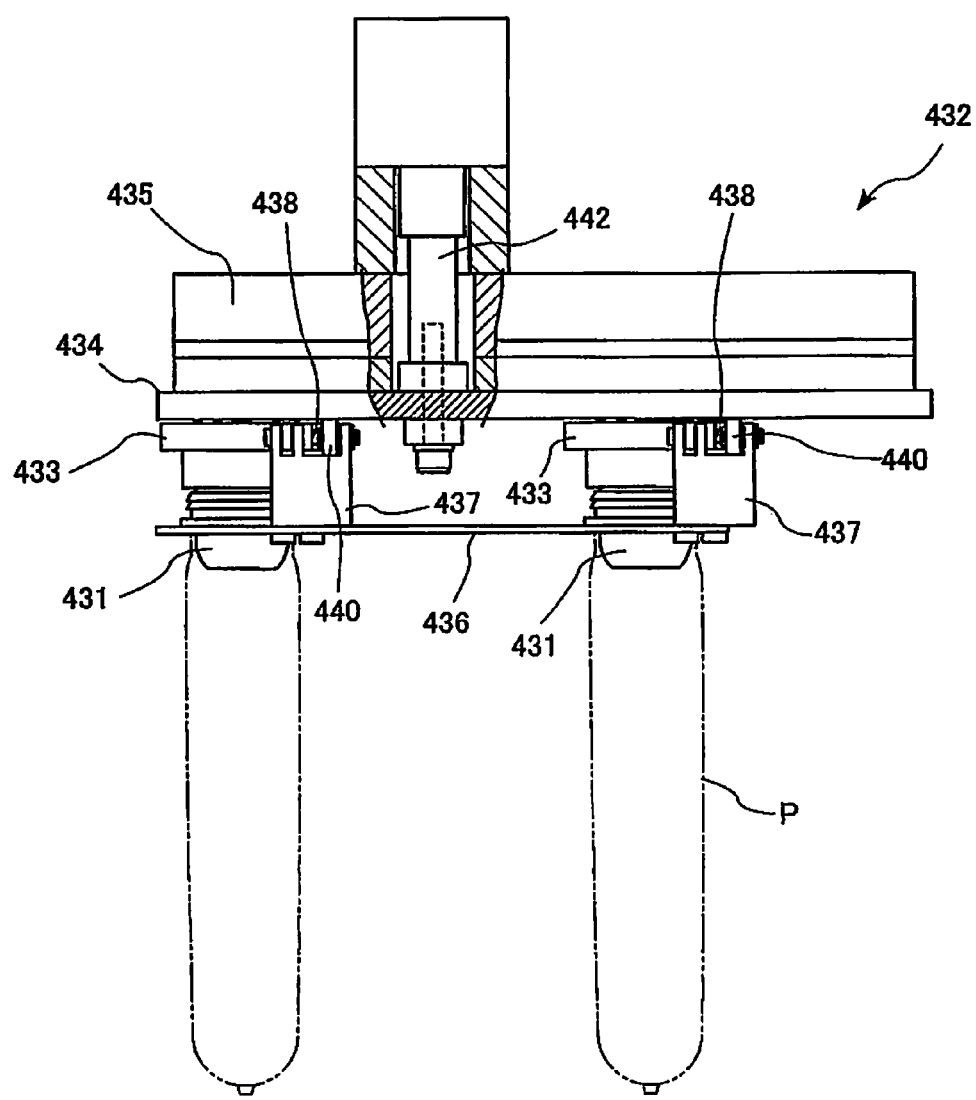
FIG. 19 is a partially sectional view showing the grip mechanism portion of the preform transport section.

In the foregoing embodiment, the suction holding portion (vacuum plug) 431 is used for transport, but the configuration of the preform transport section 430 is not limited. As shown in FIG. 18, for example, the preform transport section 430 may be equipped with a grip mechanism portion 432 along with the suction holding portion 431, and each preform P may be transported from the injection molding section 300 (ejection device 302) to the cooling section 400 by the suction holding portion 431 and the grip mechanism portion 432. The suction holding portion 431 for holding the preform P under suction is itself of the existing configuration, and thus its explanation will be omitted herein (if necessary, see WO2012/057016).

As shown in FIGS. 18 to 21, the suction holding portion (vacuum plug) 431 is fixed to a plug fixing plate 433. The plug fixing plate 433 is fixed to a fixing plate 435 provided above the plug fixing plate 433 via a chuck opening/closing plate 434. The actual preform transport section 430 is structured to have two of the fixing plates 435 connected together, but for convenience of explanation, only one of them placed on one side is illustrated.

The grip mechanism portion 432 includes a pair of chuck members 436 provided in correspondence with a plurality of (2 in the present embodiment) the suction holding portions 431 provided in parallel. The chuck member 436 is fixed to one end (lower end) of a chuck coupling member 437 at an end part on the side opposite to the preform P. The other end (upper end) of the chuck coupling member 437 is pivotably coupled to the plug fixing plate 433 by a shaft member 438. The other end of the chuck coupling member 437 is also coupled to the chuck opening/closing plate 434. In the present embodiment, the chuck coupling member 437 is formed in a nearly L-shape along the two sides of the plug fixing plate 433 (see FIG. 18). The chuck coupling member 437 is coupled to the chuck opening/closing plate 434 at a portion opposing one side of the plug fixing plate 433 which is different from the junction with the plug fixing plate 433. That is, the chuck coupling member 437 is configured to be interlocked with the action of the chuck opening/closing plate 434. As shown in FIG. 18, the chuck member 436 extends in the row direction of the preforms P so as to be capable of gripping a plurality of (e.g., two) preforms P, and is structured such that concave grooves 463a following the contour of the preform P are formed at its sites of grip on the preforms P. In this configuration, the number of the components can be decreased to simplify the structure, and the opening/closing angle of the chuck member 436, if small, can ensure adequate gripping function. It goes without saying that the chuck member 463 may be provided independently for each preform P.

Concretely, a roller 440 is rotatably provided on the chuck coupling member 437, and the chuck coupling member 437 is in contact with the chuck opening/closing plate 434 via the roller 440. The chuck opening/closing plate 434 is provided between the plug fixing plate 433 and the fixing plate 435 so as to be vertically slidable by a predetermined distance. A spring member 441 is provided between the chuck opening/closing plate 434 and the plug fixing plate 433, and the chuck opening/closing plate 434 is normally urged upward by the spring member 441, and is held in contact with the fixing plate 435. An air cylinder 442 is connected to the chuck opening/closing plate 434 (see FIG. 19), and the actuation of the air cylinder 442 enables the chuck opening/closing plate 434 to slide downward until it contacts the plug fixing plate 434.

With such a configuration, the chuck coupling member 437 moves in association with the action of the chuck opening/closing plate 434, so that the paired chuck members 436 open and close.

Figure 20:
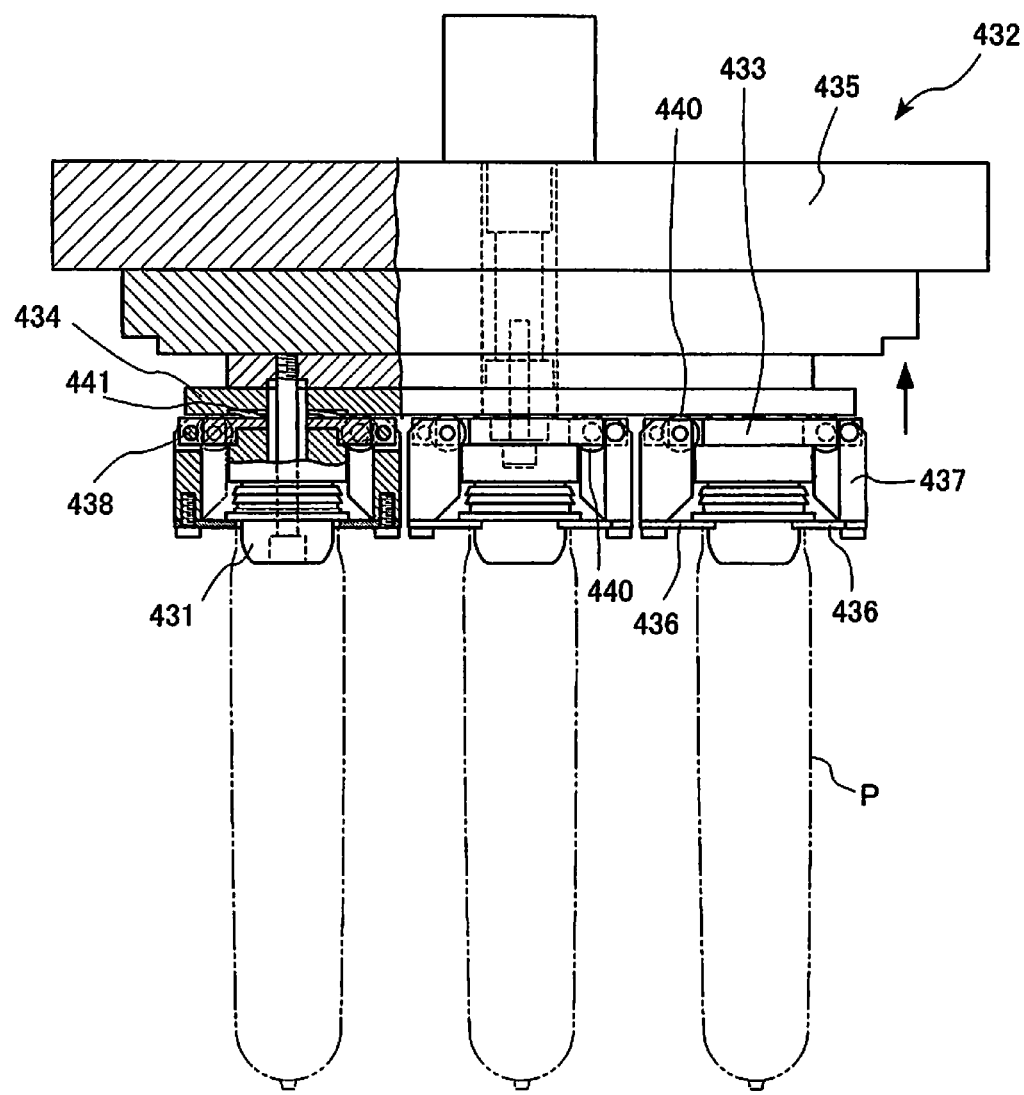
FIG. 20 is a partially sectional view showing the grip mechanism portion of the preform transport section, the view illustrating the actions of the grip mechanism portion.
Figure 21:
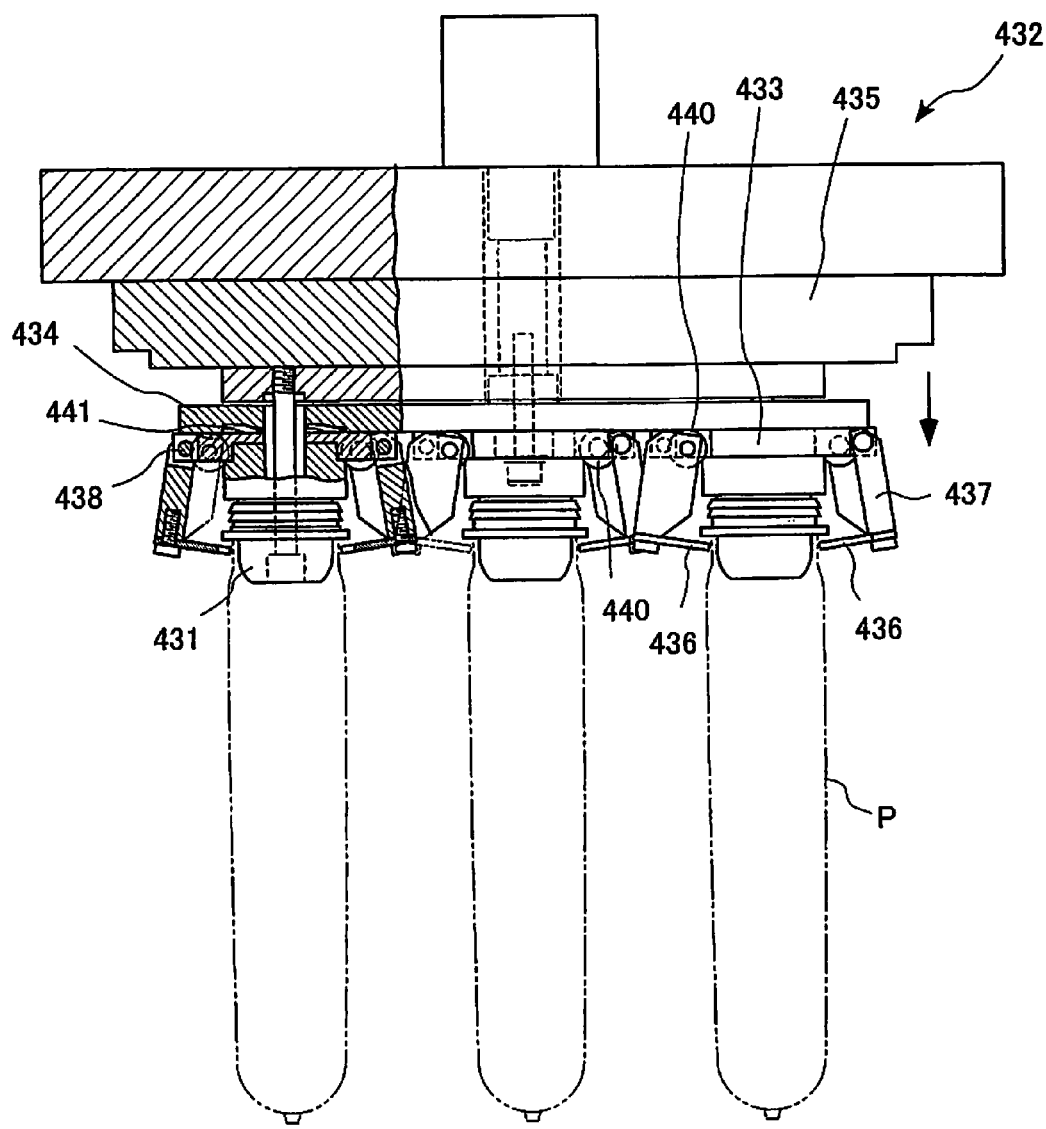
FIG. 21 is a partially sectional view showing the grip mechanism portion of the preform transport section, the view illustrating the actions of the grip mechanism portion.

Concretely, in a state where the chuck opening/closing plate 434 is located at an upper wait position by the urging force of the spring member 44, namely, a state where the plug fixing plate 433 contacts the chuck opening/closing plate 434 via the roller 440, as shown in FIG. 20, the paired chuck members 436 are closed with spring members (not shown) to grasp the neck portion of the preform P from outside. On the other hand, in a state where the chuck opening/closing plate 434 is pressed by the air cylinder 442 to make contact with the plug fixing plate 433, as shown in FIG. 21, the rollers 440 are rotated, and the paired chuck members 436 connected thereto are opened in opposition to the spring members (not shown) about the position of the shaft member 438 as a fulcrum to liberate the preform P. Upon release of the pressing force of the air cylinder 442, the chuck opening/closing plate 434 is returned to the upper wait position by the urging force of the spring member 440, and the chuck members 436 are closed by the spring members (not shown). That is, in the absence of a drive force acting from outside, the chuck member 436 of the preform transport section 430 maintains a closed state. Accordingly, even if the machine makes an emergency stop, and the supply of a power source such as air or electricity for each actuator is cut off, the preform once grasped is not allowed to fall. This can be said to contribute to the prevention of a damage to the machine or the safety of operations.

The opening/closing action of the chuck member 436 may be performed in cases as exemplified below. Concretely, as shown in FIG. 20, when the chuck opening/closing plate 434 is slid downward by the air cylinder 442 to contact the plug fixing plate 433, the paired chuck members 436 are closed to grip the neck portion of the preform P from outside. On the other hand, as shown in FIG. 21, when the chuck opening/closing plate 434 is urged upward by the spring member 441 to contact the fixing plate 435, the paired chuck members 436 are opened to liberate the preform P.

As noted above, the preform transport section 430 is equipped with the grip mechanism portion 432 along with the suction holding portion 431. Thus, the preform transport section 430 can hold, more reliably, the preform P injection molded in the injection molding section 300 and transport it to the cooling section 400. Since the preform P is gripped by the grip mechanism portion 432, the suction force on the preform P by the suction holding portion 431 can be weakened. Thus, the occurrence of concave deformation in the barrel portion of the preform P in accordance with its suction can be suppressed.

Furthermore, after the preform P held by the ejection device 302 is gripped by the grip mechanism portion 432, it is preferred to stop the suction of the interior of the preform P by the suction holding portion 431. By this procedure, occurrence of concave deformation in the barrel portion of the preform P during transport of the preform P to the cooling section 400 can be suppressed more reliably. Since suction takes place during delivery of the preform P from the ejection device 302, moreover, the suction holding portion 431 is fitted to the inside of the neck of the preform P, whereby the top surface of the preform P can be brought into reliable contact with the airtight site of the suction holding portion 431. Consequently, trouble during transport associated with the positional inaccuracy (positional displacement) of the preform P can be decreased markedly.

The present embodiment has been described in detail as above, but it should be easily understandable to those skilled in the art that many changes and modifications which do not substantively deviate from the novel matters and effects of the present invention can be made. Thus, all such modifications are to be included in the scope of the present invention. For example, terms described, at least once, together with different terms having a broader sense or the same sense in the specification or drawings can be replaced by such different terms anywhere in the specification or drawings.

EXPLANATIONS OF LETTERS OR NUMERALS

1 blow molding machine, 2 machine base, 10 blow molding section, 11 blow cavity mold, 20 ejection section, 100 delivery unit, 102 rail, 102A, 102B pair of rail members, 110 elevation block, 112 blade, 112A protruding piece, 114 endless member (belt), 116A to 116C pulley, 142 swing fulcrum, 144 arm, 150 opening/closing drive portion (air cylinder), 200 device of post-process (filling device), 202 machine base, 210 transport device, B, B1 to B3 container (bottle), D1 opening/closing direction of blow cavity mold, D2 delivery direction, F flange portion, N neck portion, P preform

The invention claimed is:

1. A blow molding machine, comprising:
   a blow molding section for blow molding a plurality of containers within a blow cavity mold which has been mold clamped; and
   an ejection section for holding the plurality of containers, while maintaining a blow molding pitch, and ejecting the plurality of containers from the blow cavity mold, which has been mold opened, to an ejection position outside the blow cavity mold,
   the blow molding machine further comprising a delivery unit for delivering the plurality of containers located at the ejection position to a post-process subsequent to the blow molding machine,
   wherein the delivery unit includes
   a rail for holding, delivering and guiding the plurality of containers, and
   an elevation block raised and lowered relative to the rail, and
   the elevation block includes
   a plurality of blades,
   an endless member having the plurality of blades fixed thereto at the blow molding pitch, and
   a drive portion for driving the endless member to run.

2. The blow molding machine according to claim 1, further comprising
 a machine base on which the blow molding section is mounted,
 wherein the delivery unit protrudes from the machine base along a container delivery direction orthogonal to an opening/closing direction of the blow cavity mold.

3. The blow molding machine according to claim 2, wherein
 the rail includes a pair of rail members which, with the plurality of containers being in an upright state where a neck portion of each container faces upward, supports from below a flange portion provided in the neck portion, the pair of rail members being arranged along a container transport direction, and
 each of the plurality of blades pushes the neck portion.

4. The blow molding machine according to claim 3, wherein
 each of the plurality of blades includes a protruding piece to be inserted between the paired rail members, and
 the protruding piece pushes the flange portion.

5. The blow molding machine according to claim 3, further comprising
 a rail drive portion for driving at least one of the paired rail members to drop the plurality of containers at the ejection position.

6. The blow molding machine according to claim 4, further comprising
 a rail drive portion for driving at least one of the paired rail members to drop the plurality of containers at the ejection position.

7. The blow molding machine according to claim 3, wherein
 the pair of rail members is supported to be retreatable to a position which does not interfere with a carry-in/carry-out path of the blow cavity mold parallel to the container delivery direction.

8. The blow molding machine according to claim 4, wherein
 the pair of rail members is supported to be retreatable to a position which does not interfere with a carry-in/carry-out path of the blow cavity mold parallel to the container delivery direction.

9. The blow molding machine according to claim 5, wherein
 the pair of rail members is supported to be retreatable to a position which does not interfere with a carry-in/carry-out path of the blow cavity mold parallel to the container delivery direction.

10. The blow molding machine according to claim 6, wherein
 the pair of rail members is supported to be retreatable to a position which does not interfere with a carry-in/carry-out path of the blow cavity mold parallel to the container delivery direction.

11. The blow molding machine according to claim 1, wherein
 the blow cavity mold can be switched between a first blow cavity mold whose blow molding pitch is a first blow molding pitch and a second blow cavity mold whose blow molding pitch is a second blow molding pitch, the second blow molding pitch being n times (n is an integer of 2 or more) the first blow molding pitch, and
 the plurality of blades are fixed to the endless member at the first blow molding pitch.

12. A blow molding machine, comprising:
 an injection molding section for injection molding a plurality of preforms; and
 a blow molding section for stretch blow molding a predetermined number of the preforms, at a time, into containers,
 the blow molding machine further comprising
 a transport section including an intermittent transport section for intermittently transporting the predetermined number of preforms along a transport path,
 a transfer section for gripping the predetermined number of preforms being transported on the transport path by the intermittent transport section, and transferring the predetermined number of preforms to the blow molding section,
 a discharge section, provided downstream of the transfer section on the transport path, for discharging the preforms from the transport path, and
 change means for making a change in at least one of an injection molding cycle time and a blow molding cycle time, and making a change in a transport speed of the preform by the transport section in accordance with the change,
 wherein if some of the plurality of preforms go beyond the transfer section at a timing, at which the transfer section transfers the preform to the blow molding section, in association with the changes by the change means, the transport section transports the predetermined number of preforms to the discharge section.

13. The blow molding machine according to claim 2, further comprising
 a heating section equipped with a heater for heating the preforms being continuously transported on the transport path,
 wherein the change means further changes an output of the heater.

14. A blow molding machine, comprising:
 an injection molding section for injection molding a preform; and
 a blow molding section for stretch blow molding the preform into a container,
 the blow molding machine further comprising
 a cooling section for forcibly cooling the preform injection molded by the injection molding section, and
 a preform transport section having:
 an insertion portion to be inserted into a neck portion of the preform,
 a suction holding portion for sucking an interior of the preform, with the insertion portion being inserted into the neck portion of the preform, to hold the preform, and
 a grip mechanism portion equipped with an openable and closable chuck portion which grips the preform from outside the neck portion of the preform, wherein the preform transport section is adapted to transport the preform, which has been injection molded by the injection molding section, to the cooling section with the neck portion having the insertion portion therein, and with the neck portion being gripped by the chuck portion.

15. The blow molding machine according to claim 14, wherein
 the preform transport section stops suction of the interior of the preform by the suction holding portion when the preform is gripped by the grip mechanism portion.

* * * * *